(12) United States Patent
Pruthi et al.

(10) Patent No.: US 9,830,591 B2
(45) Date of Patent: Nov. 28, 2017

(54) PROVIDING ACCESS TO ACCOUNT INFORMATION USING AUTHENTICATION TOKENS

(71) Applicant: Bank of America Corporation, Charlotte, NC (US)

(72) Inventors: Kapil Pruthi, Bothell, WA (US); Wenhui Meng, Bothell, WA (US); Harigopal K. Ponnapalli, Hyderabad (IN); Ashish Arora, Bellevue, WA (US); Kenneth C. Aguiar, Sandwich, MA (US); Andrew T. Keys, Albany, OR (US); Yair Frankel, Albany, OR (US)

(73) Assignee: Bank of America Corporation, Charlotte, NC (US)

( * ) Notice: Subject to any disclaimer, the term of this patent is extended or adjusted under 35 U.S.C. 154(b) by 338 days.

(21) Appl. No.: 14/722,849

(22) Filed: May 27, 2015

(65) Prior Publication Data

US 2016/0350748 A1 Dec. 1, 2016

(51) Int. Cl.
*G06Q 40/00* (2012.01)
*G06Q 20/36* (2012.01)
*G06Q 20/38* (2012.01)

(52) U.S. Cl.
CPC ..... *G06Q 20/3674* (2013.01); *G06Q 20/3672* (2013.01); *G06Q 20/382* (2013.01); *G06Q 20/38215* (2013.01)

(58) Field of Classification Search
CPC ......... G06Q 20/10; G06Q 40/02; G06F 21/31

(Continued)

(56) References Cited

U.S. PATENT DOCUMENTS 9,363,262 B1 6/2016 Wilkes
2002/0161707 A1\* 10/2002 Cole ...................... G06Q 20/02
705/42

(Continued)

OTHER PUBLICATIONS

"OAuth," from Wikipedia, the free encyclopedia, accessed Apr. 13, 2015 from http://en.wikipedia.org/wiki/OAuth, 10 pages.

(Continued)

*Primary Examiner* — Jamara Franklin
(74) *Attorney, Agent, or Firm* — Banner & Witcoff, Ltd.; Michael A. Springs

(57) ABSTRACT

Methods, systems, and computer-readable media for providing access to account information using authentication tokens are presented. In some embodiments, a customer of a financial institution may visit an account information aggregator site and request to add an account maintained by the financial institution to a collection of accounts for which the aggregator collects account information on behalf of the customer. Rather than providing their username, password, or other bank login credentials to the aggregator, the customer may be redirected to a page provided by the financial institution where the customer can enter the customer's credentials and authenticate with the financial institution. After authenticating the customer, the financial institution may generate a token and provide the token to the aggregator. Subsequently, the aggregator may use the token to obtain read-only access to financial account information for one or more financial accounts that are maintained by the financial institution for the customer.

20 Claims, 30 Drawing Sheets

(58) Field of Classification Search
USPC ....... 235/375, 379, 380, 382; 705/35, 39, 44
See application file for complete search history.

(56) References Cited

U.S. PATENT DOCUMENTS

| | | |
|---|---|---|
| 2010/0138316 A1 | 6/2010 | Connors et al. |
| 2013/0227661 A1 | 8/2013 | Gupta et al. |
| 2014/0222664 A1 | 8/2014 | Milne |
| 2014/0222668 A1 | 8/2014 | Wall et al. |
| 2014/0223516 A1 | 8/2014 | Vongsouvanh et al. |
| 2014/0223573 A1 | 8/2014 | Reedy et al. |
| 2014/0250122 A1 | 9/2014 | Fredericks et al. |
| 2014/0258060 A1 | 9/2014 | Lefebvre et al. |
| 2014/0258085 A1 | 9/2014 | Bargagli et al. |
| 2014/0258086 A1 | 9/2014 | Bargagli et al. |
| 2014/0258087 A1 | 9/2014 | Bargagli et al. |
| 2014/0279211 A1 | 9/2014 | Bruber et al. |
| 2014/0279274 A1 | 9/2014 | Subbarao et al. |
| 2014/0279489 A1 | 9/2014 | Russell et al. |
| 2014/0279533 A1 | 9/2014 | Hamilton et al. |
| 2014/0279552 A1 | 9/2014 | Ortiz et al. |
| 2014/0282881 A1 | 9/2014 | Li et al. |
| 2014/0282961 A1 | 9/2014 | Dorfman et al. |
| 2014/0282977 A1 | 9/2014 | Madhu et al. |
| 2014/0283023 A1 | 9/2014 | Flavin et al. |
| 2014/0289118 A1 | 9/2014 | Kassemi et al. |
| 2014/0297537 A1 | 10/2014 | Kassemi et al. |
| 2014/0310243 A1 | 10/2014 | McGee et al. |
| 2014/0317012 A1 | 10/2014 | Can et al. |
| 2014/0317640 A1 | 10/2014 | Harm et al. |
| 2014/0324624 A1 | 10/2014 | Ward et al. |
| 2014/0325531 A1 | 10/2014 | Harm et al. |
| 2014/0337175 A1 | 11/2014 | Katzin et al. |
| 2014/0337711 A1 | 11/2014 | Poole et al. |
| 2014/0372188 A1 | 12/2014 | Desideri |
| 2014/0373130 A1 | 12/2014 | de Oliveira et al. |
| 2014/0373170 A1 | 12/2014 | Brudnicki et al. |
| 2014/0380315 A1 | 12/2014 | Khajuria et al. |
| 2014/0380431 A1 | 12/2014 | Alonso Cebrian et al. |
| 2014/0380453 A1 | 12/2014 | Alonso Cebrian et al. |
| 2015/0019666 A1 | 1/2015 | Ruff et al. |
| 2015/0019944 A1 | 1/2015 | Kalgi |
| 2015/0026049 A1 | 1/2015 | Theurer et al. |
| 2015/0046327 A1 | 2/2015 | Taupitz |
| 2015/0081536 A1 | 3/2015 | Musser et al. |
| 2015/0088754 A1 | 3/2015 | Kirsch |
| 2015/0112836 A1 | 4/2015 | Godsey et al. |
| 2015/0113608 A1 | 4/2015 | Chermside |
| 2015/0120445 A1 | 4/2015 | Romero |
| 2015/0121462 A1 | 4/2015 | Courage et al. |
| 2015/0127439 A1 | 5/2015 | Campos De Figueiredo Faceira et al. |
| 2015/0127524 A1 | 5/2015 | Jacobs et al. |
| 2015/0127565 A1 | 5/2015 | Chevalier et al. |
| 2015/0134956 A1 | 5/2015 | Stachura et al. |
| 2015/0135279 A1 | 5/2015 | Hayat |
| 2015/0135336 A1 | 5/2015 | Arasavelli et al. |
| 2015/0143129 A1 | 5/2015 | Duffy |
| 2015/0143461 A1 | 5/2015 | Uetabira |

OTHER PUBLICATIONS

Jun. 7, 2017 U.S. Non-Final Office Action—U.S. Appl. No. 14/722,793.

* cited by examiner

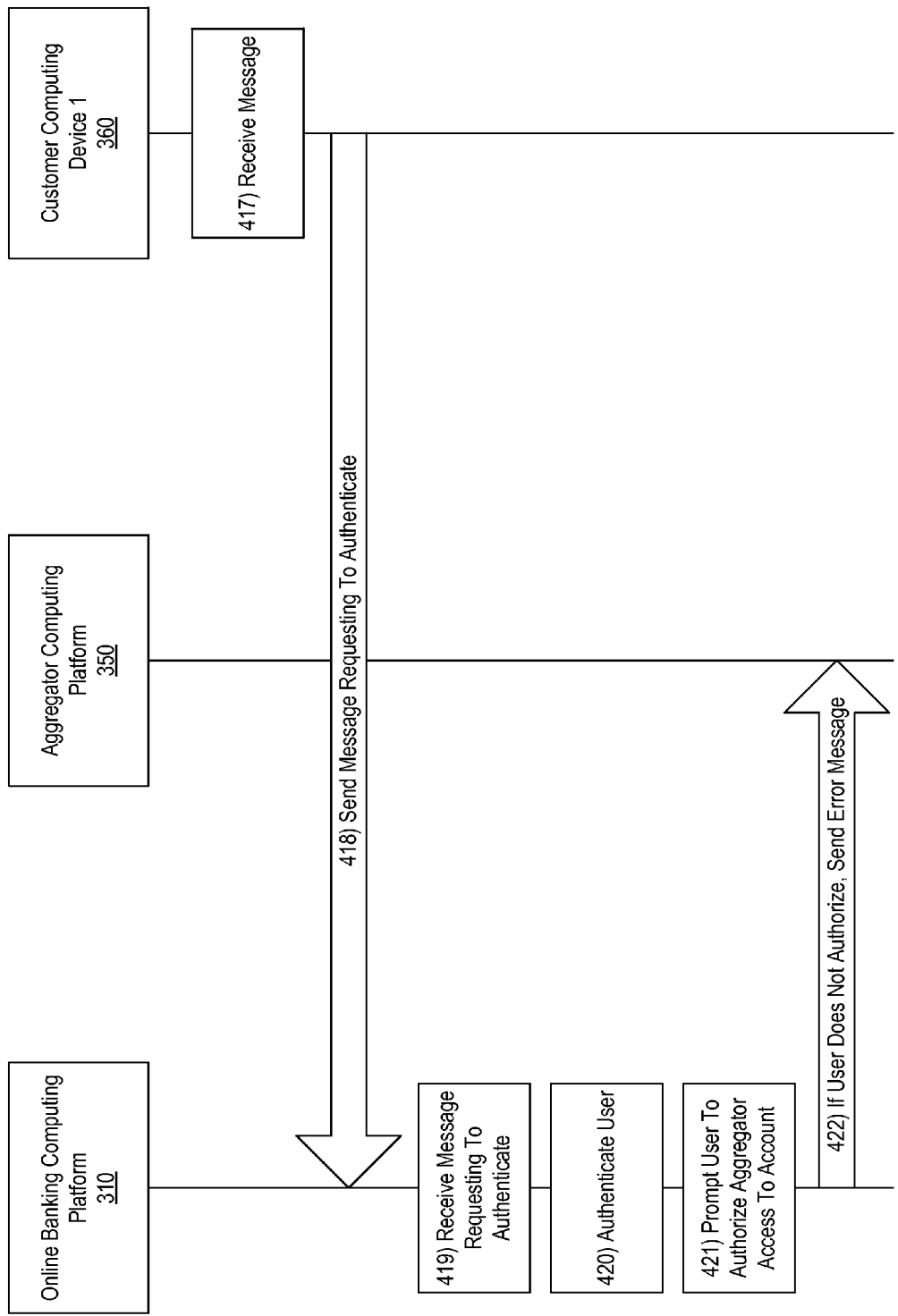

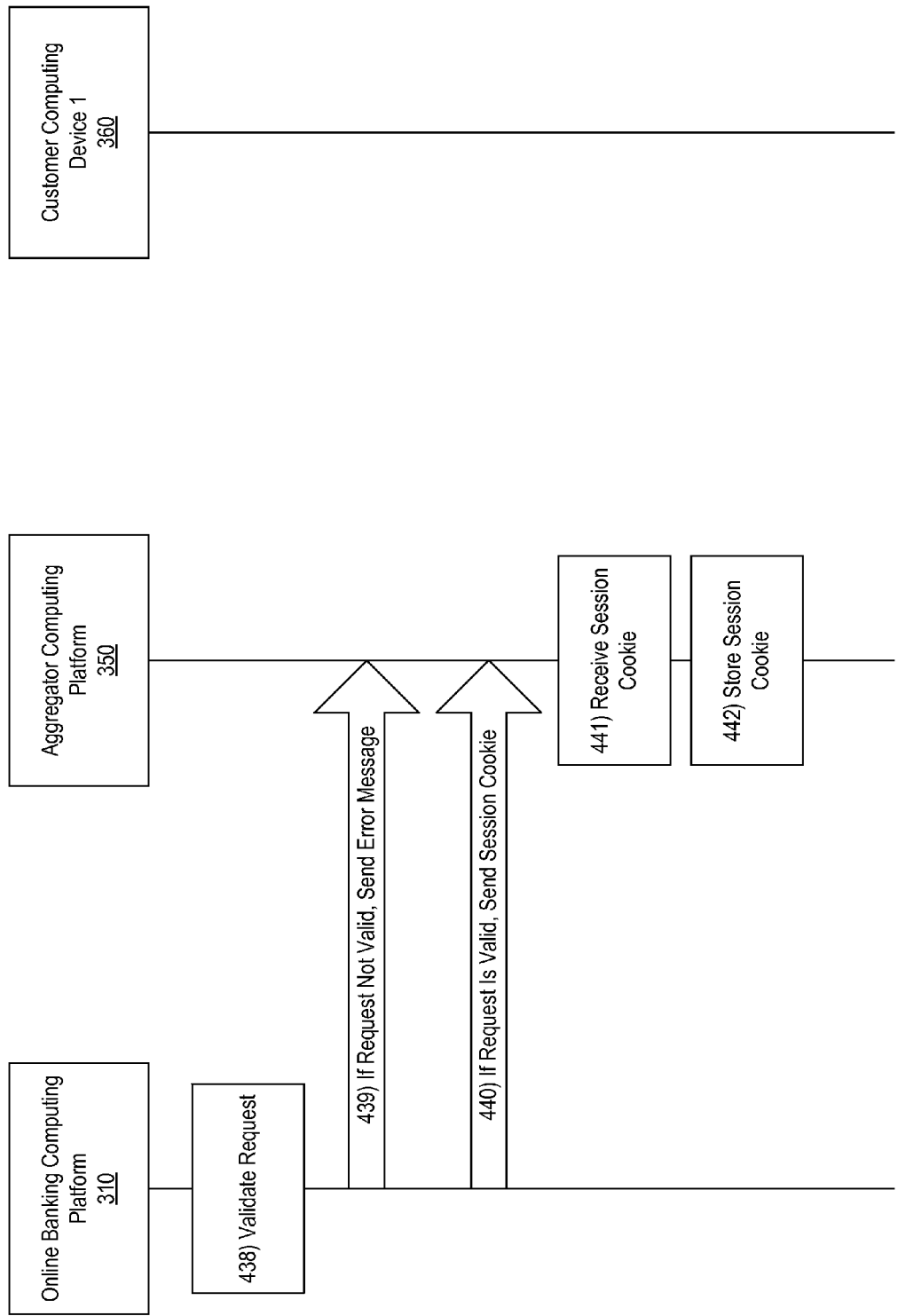

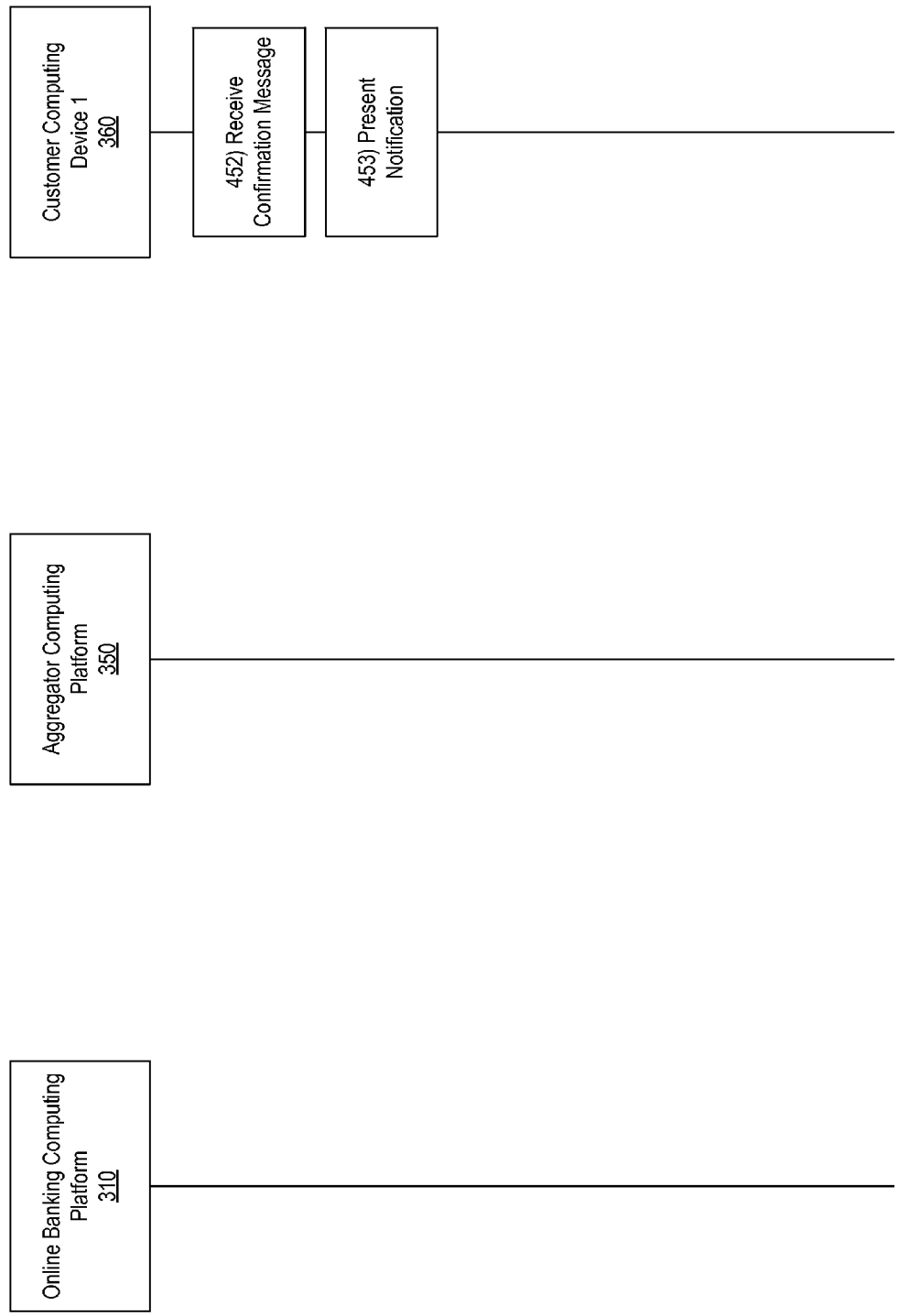

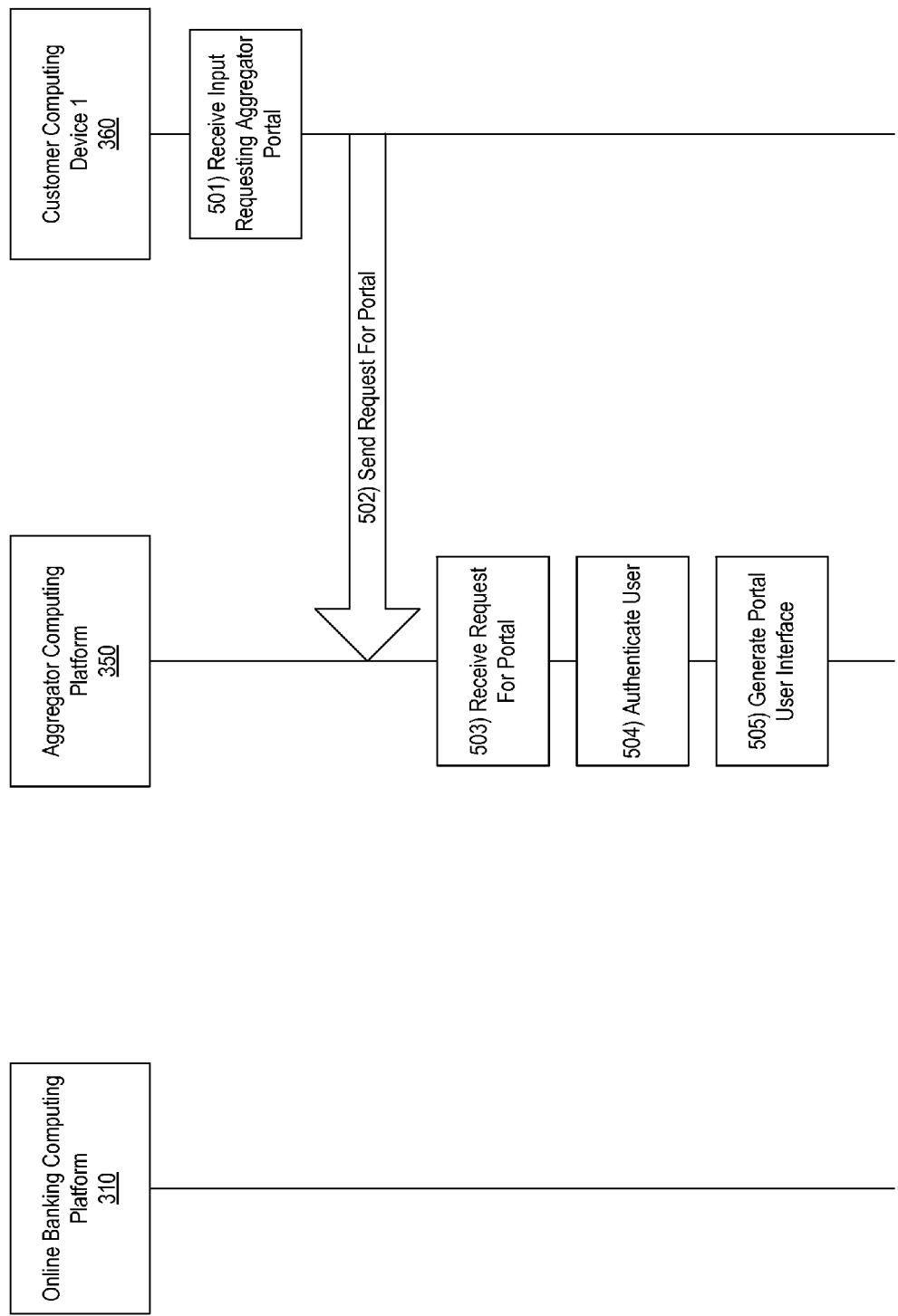

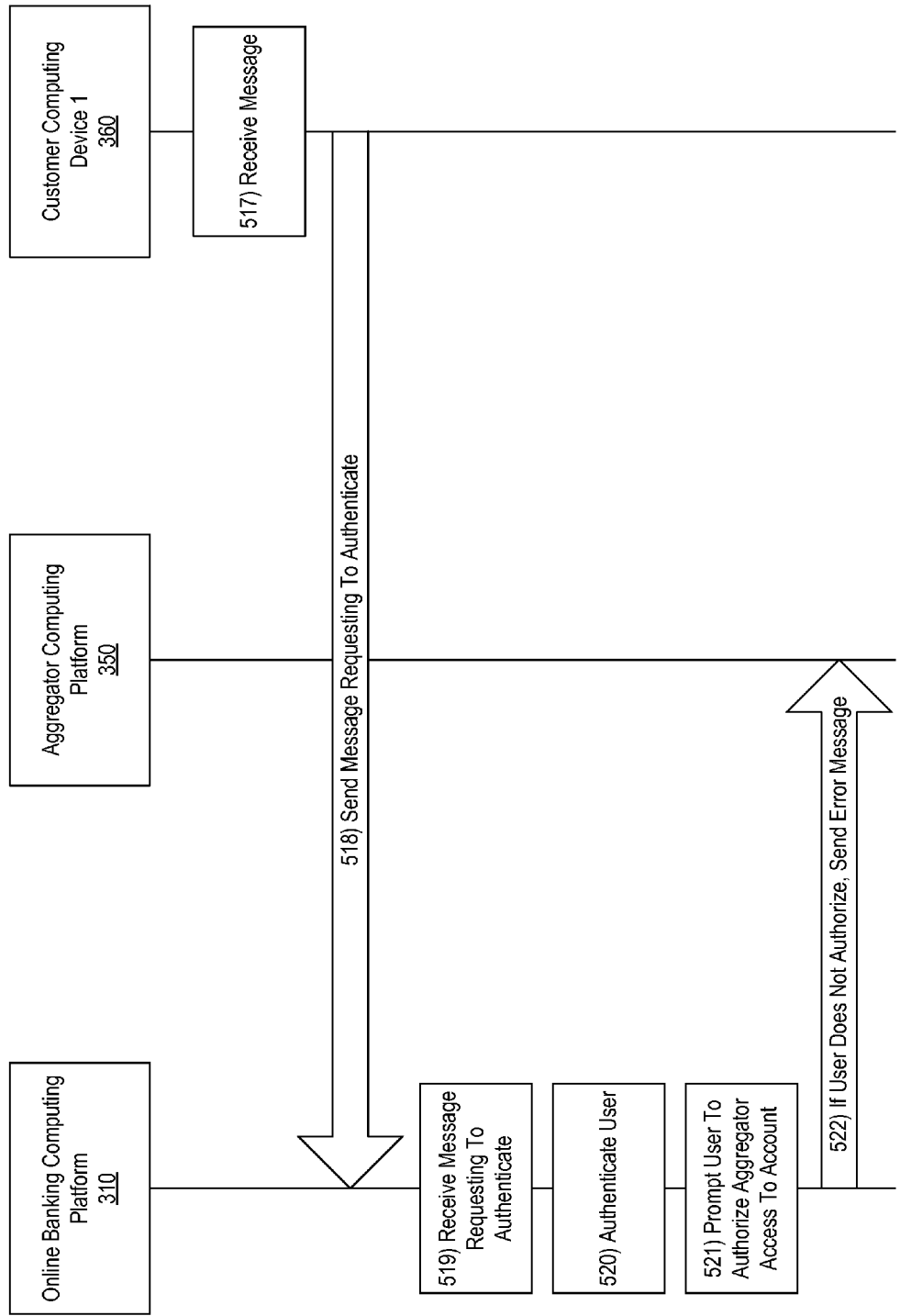

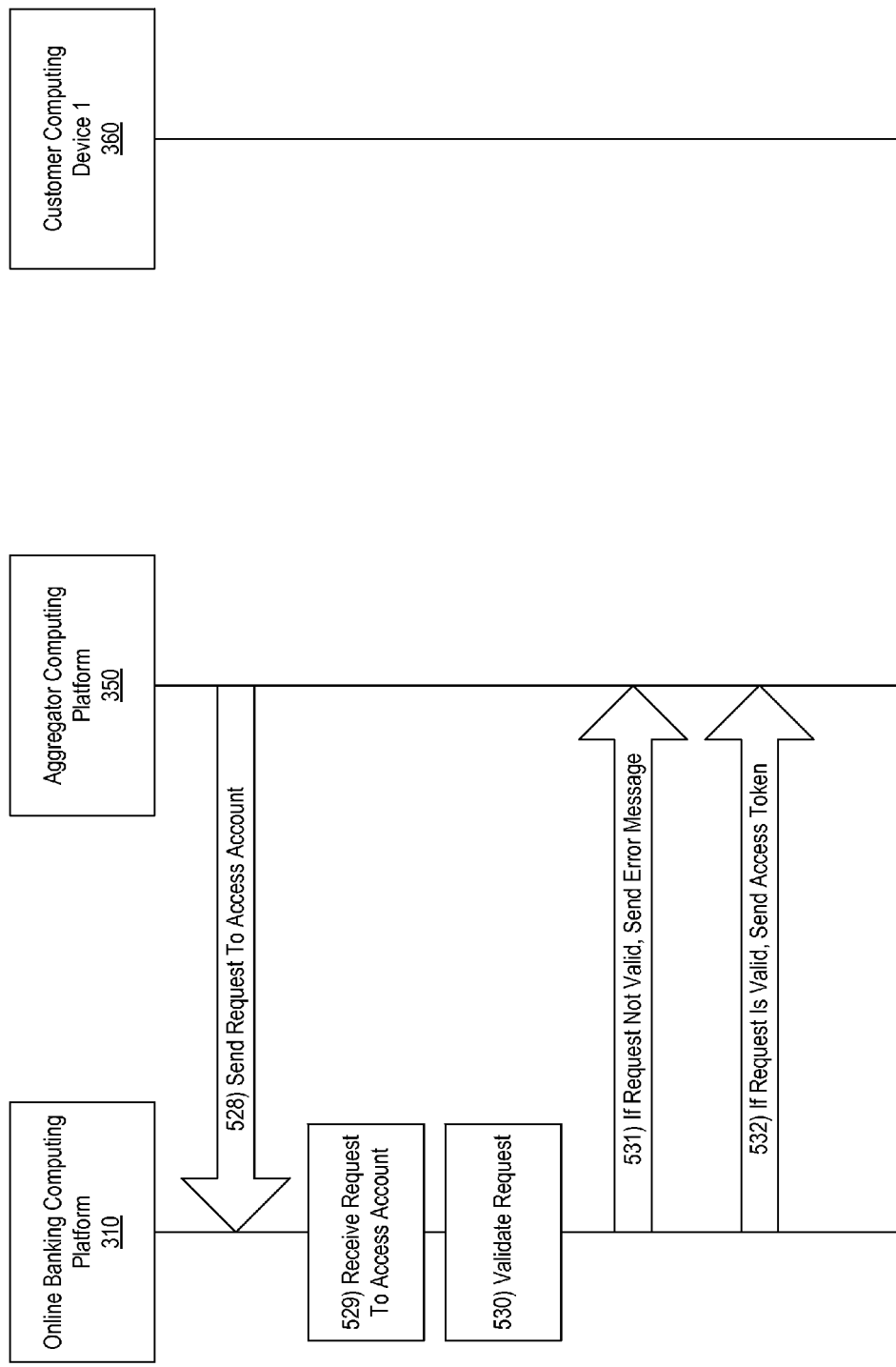

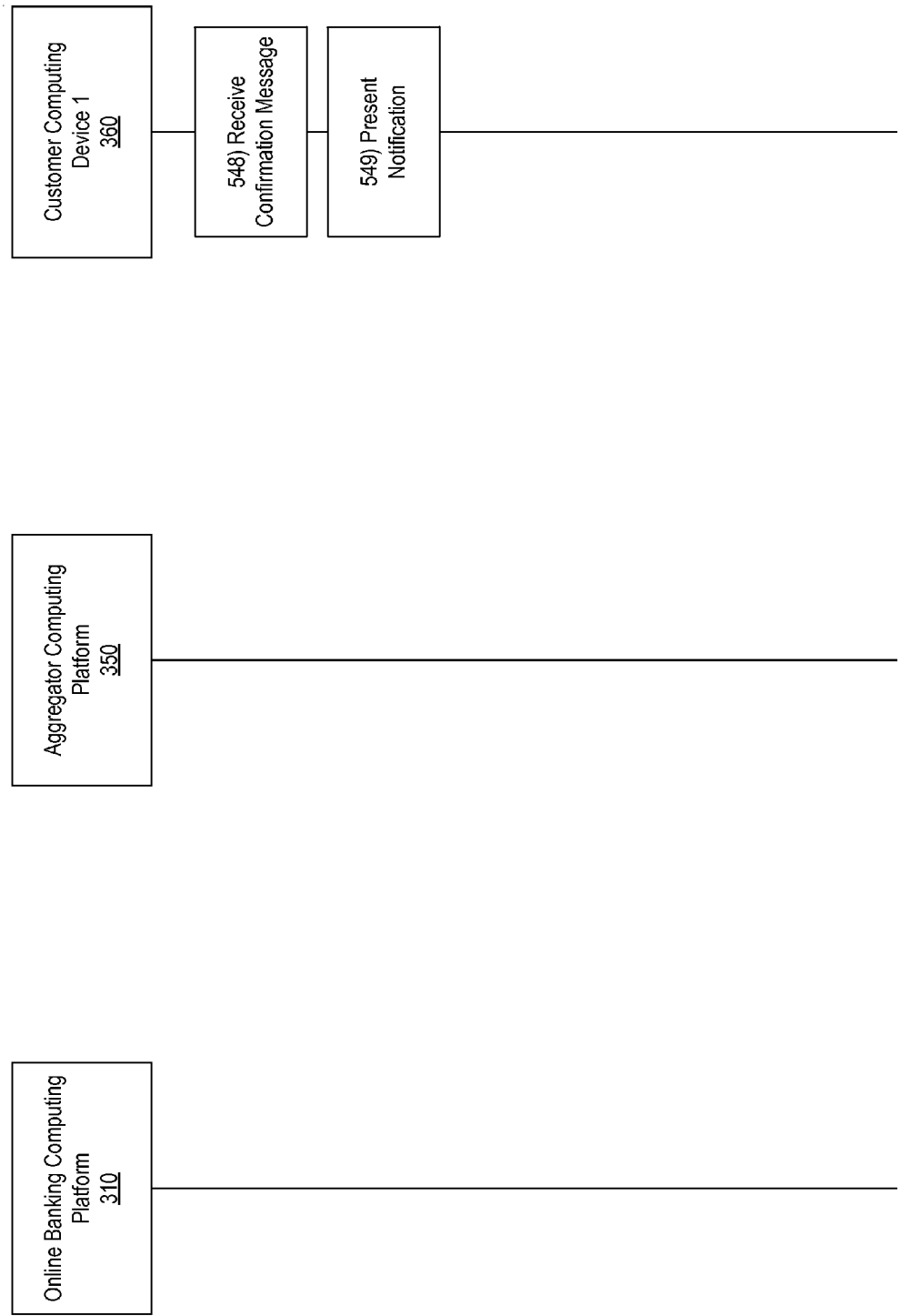

PROVIDING ACCESS TO ACCOUNT INFORMATION USING AUTHENTICATION TOKENS

BACKGROUND

Aspects of the disclosure relate to computer hardware and software. In particular, one or more aspects of the disclosure generally relate to computer hardware and software for providing access to account information using authentication tokens.

Large organizations, such as financial institutions, may serve many customers, and increasingly, customers of such organizations are using computing devices, including mobile computing devices, to interact with the organizations about the products and/or services offered by these organizations. Some large organizations may even provide specialized websites and/or customer portals for their customers that allow customers to view and/or purchase various products and/or services online, conduct transactions, and view and/or manage one or more accounts.

These websites and customer portals are becoming increasingly popular, and customers of various organizations continue to demand greater functionality via such portals, as well as increasingly easy-to-use and convenient ways of utilizing such functionality. As organizations, such as financial institutions, add more functionality to such portals, it may be important to ensure that the information available via such portals remains secure. In some instances, however, it may be difficult to provide such functionality and greater convenience to customers while also ensuring the security of customer account information and pursuing ever greater levels of security for such account information.

SUMMARY

Aspects of the disclosure relate to various systems and techniques that provide effective, efficient, scalable, and convenient ways of managing and providing access to customer account information, particularly in ways that enable customer account information to be securely shared with a third-party entity that may be authorized by a customer of an organization, such as a financial institution, to access such information.

Increasingly, customers of financial institutions are using third-party account information aggregators to compile and present their financial account information from multiple different financial institutions in a single user interface. Account information aggregators may collect this information on a periodic basis and/or on an on-demand basis from various customer portals that may be provided by the multiple different financial institutions with which a particular individual may have one or more financial accounts.

For example, a particular individual may have a checking account and a savings account with a first financial institution, a credit card with a second financial institution, another credit card with a third financial institution, and one or more brokerage accounts and/or retirement accounts with a fourth financial institution. In addition to keeping tabs on all of these accounts individually via the various customer portals that may be provided by each of the different financial institutions that maintain one or more accounts for the individual, the individual also may use a third-party financial account information aggregator (which, e.g., might not be affiliated with any of the financial institutions) to compile and present all of the individual's financial account information for all of his or her accounts at all of the various financial institutions in a single web portal or other user interface. To accomplish this, the individual may have to share their username, password, and/or any other login credentials for each of their financial accounts with the account information aggregator. This may present a security risk both for the individual (e.g., because all of their financial account credentials may be stored in one place by a third-party entity not affiliated with any of the financial institutions) and for each individual financial institution (e.g., because the individual's login credentials may be maintained by a third-party entity outside of the financial institution's control). In addition, the account information aggregator may capture financial account information by performing a screen scrape on a customer portal or other user interface provided by each financial institution, and while performing this screen scrape, the account information aggregator essentially may have full access to the individual's financial accounts, including the ability to transfer funds, perform other transactions, and/or execute commands, even if the aggregator is not authorized to do so.

In addition to these security concerns, there may also be usability concerns that arise when a customer of a financial institution uses a third-party account information aggregator. For example, if the customer changes his or her account password with the financial institution, he or she also may have to update their password information with the account information aggregator. Furthermore, the financial institution might not be able to effectively regulate and/or restrict aggregator traffic, as the aggregator may connect to one or more customer portals provided by the financial institution in the same manner as regular customers do. This concern may be further complicated as an aggregator adds to their computing infrastructure, as the financial institution might not be able to effectively track or register network addresses of specific servers as being used by particular aggregators. Moreover, the customer of the financial institution might not have a convenient way of de-authorizing an aggregator from accessing their financial account information other than changing their password. These and other challenges may thus present information security risks for both the financial institution and its customers.

By implementing one or more aspects of the disclosure, a financial institution, as well as its computer systems and customers, may be able to have more control over whether and/or how third-party account information aggregators access customer account information. In particular, one or more aspects of the disclosure provide ways of using authentication tokens to manage, control, and provide access to customer account information.

For example, in accordance with one or more aspects of the disclosure discussed in greater detail below, a customer of a financial institution may visit an account information aggregator site and request to add an account maintained by the financial institution to a collection of accounts for which the aggregator may collect account information on behalf of the customer. Rather than providing their username, password, and/or other bank login credentials to the aggregator, the customer may be redirected by the aggregator to a page provided by the financial institution where the customer can enter their credentials and authenticate with the financial institution. After authenticating the customer, the financial institution may generate a token and provide the token to the aggregator. Subsequently, the aggregator may use the token to obtain read-only access to financial account information (e.g., account balance information, transaction history information, and/or the like) for one or more financial accounts that are maintained by the financial institution for the customer.

Advantageously, the token may enable the account information aggregator to obtain only read-only access (e.g., rather than full access) to the customer portal provided by the financial institution, so the customer and the financial institution can limit how the aggregator accesses the customer portal and the customer's account information. In addition, the customer's login credentials may be maintained entirely in the financial institution's domain (e.g., rather than being provided to and/or stored by the aggregator). Additionally, the customer may be able to revoke the aggregator's access to their account information via the customer portal provided by the financial institution, as illustrated below, because the financial institution may control whether and for how long the token is valid.

As illustrated in greater detail below, these features and/or others may provide more effective, efficient, scalable, and convenient ways for a financial institution and its customers to share financial account information with one or more third-party account information aggregators in a safe and secure manner.

In accordance with one or more embodiments, an online banking computing platform having at least one processor, a memory, and a communication interface may receive, via the communication interface, and from a computing platform associated with a third-party financial account information aggregator, a request to register for access to an online banking account associated with a customer of a financial institution. Based on receiving the request to register for access to the online banking account associated with the customer of the financial institution, the online banking computing platform may prompt the customer of the financial institution to authorize the third-party financial account information aggregator to access information associated with the online banking account associated with the customer of the financial institution. If the customer of the financial institution authorizes the third-party financial account information aggregator to access the information associated with the online banking account associated with the customer of the financial institution, the online banking computing platform may send, via the communication interface, and to the computing platform associated with the third-party financial account information aggregator, a refresh token. After sending the refresh token to the computing platform associated with the third-party financial account information aggregator, the online banking computing platform may receive, via the communication interface, and from the computing platform associated with the third-party financial account information aggregator, a request to access the online banking account associated with the customer of the financial institution. Subsequently, the online banking computing platform may validate the request to access the online banking account associated with the customer of the financial institution based on the refresh token. If the request to access the online banking account associated with the customer of the financial institution is valid, the online banking computing platform may provide, to the computing platform associated with the third-party financial account information aggregator, an online banking user interface that includes financial account information associated with the online banking account associated with the customer of the financial institution.

In some embodiments, the online banking account may be associated with one or more financial accounts which are maintained for the customer by the financial institution, and the system may be operated by the financial institution. In some instances, the computing platform associated with the third-party financial account information aggregator may be configured to collect information associated with the one or more financial accounts which are maintained for the customer by the financial institution and may be further configured to collect information associated with one or more other financial accounts which are maintained for the customer by one or more other financial institutions different from the financial institution operating the system.

In some embodiments, prompting the customer of the financial institution to authorize the third-party financial account information aggregator to access the information associated with the online banking account associated with the customer of the financial institution may include: sending, via the communication interface, and to a computing device associated with the customer of the financial institution, an authorization prompt message that includes a prompt for the customer of the financial institution to allow the third-party financial account information aggregator to access the information associated with the online banking account; and receiving, via the communication interface, and from the computing device associated with the customer of the financial institution, an authorization response message that includes a response to the prompt included in the authorization prompt message.

In some embodiments, if the customer of the financial institution does not authorize the third-party financial account information aggregator to access the information associated with the online banking account associated with the customer of the financial institution, the online banking computing platform may send, via the communication interface, and to the computing platform associated with the third-party financial account information aggregator, an error message.

In some embodiments, the request to access the online banking account associated with the customer of the financial institution may include a copy of the refresh token. In some instances, validating the request to access the online banking account associated with the customer of the financial institution based on the refresh token may include validating the copy of the refresh token included in the request to access the online banking account associated with the customer of the financial institution.

In some embodiments, prior to providing the online banking user interface that includes the financial account information associated with the online banking account associated with the customer of the financial institution, the online banking computing platform may send, via the communication interface, and to the computing platform associated with the third-party financial account information aggregator, an access token, based on validating the copy of the refresh token included in the request to access the online banking account associated with the customer of the financial institution. Subsequently, the online banking computing platform may receive, via the communication interface, and from the computing platform associated with the third-party financial account information aggregator, an access request message that includes a copy of the access token. Thereafter, the online banking computing platform may validate the copy of the access token included in the access request message. Based on validating the copy of the access token included in the access request message, the online banking computing platform may send, via the communication interface, and to the computing platform associated with the third-party financial account information aggregator, a session cookie configured to enable access to the online banking user interface that includes the financial account information associated with the online banking account associated with the customer of the financial institution.

In some embodiments, validating the copy of the refresh token included in the request to access the online banking account associated with the customer of the financial institution may include determining that the request to access the online banking account associated with the customer of the financial institution is not valid based on revocation information indicating that the customer has revoked the third-party financial account information aggregator's authorization to access the information associated with the online banking account associated with the customer of the financial institution. In some instances, the customer may have revoked the third-party financial account information aggregator's authorization to access the information associated with the online banking account associated with the customer of the financial institution via the online banking user interface that includes the financial account information associated with the online banking account associated with the customer of the financial institution.

In some embodiments, providing the online banking user interface that includes the financial account information associated with the online banking account associated with the customer of the financial institution may include providing read-only access to the online banking user interface by presenting one or more of account balance information and transaction history information via the online banking user interface and preventing one or more transactions from being conducted via the online banking user interface.

In some embodiments, if the request to access the online banking account associated with the customer of the financial institution is not valid, the online banking computing platform may send, via the communication interface, and to the computing platform associated with the third-party financial account information aggregator, an error message.

In accordance with one or more additional or alternative embodiments, an online banking computing platform having at least one processor, a memory, and a communication interface may receive, via the communication interface, and from a computing platform associated with a third-party financial account information aggregator, a request to register for access to an online banking account associated with a customer of a financial institution. Based on receiving the request to register for access to the online banking account associated with the customer of the financial institution, the online banking computing platform may prompt the customer of the financial institution to authorize the third-party financial account information aggregator to access information associated with the online banking account associated with the customer of the financial institution. If the customer of the financial institution authorizes the third-party financial account information aggregator to access the information associated with the online banking account associated with the customer of the financial institution, the online banking computing platform may send, via the communication interface, and to the computing platform associated with the third-party financial account information aggregator, a refresh token. After sending the refresh token to the computing platform associated with the third-party financial account information aggregator, the online banking computing platform may receive, via the communication interface, and from the computing platform associated with the third-party financial account information aggregator, a request to access the online banking account associated with the customer of the financial institution. Subsequently, the online banking computing platform may validate the request to access the online banking account associated with the customer of the financial institution based on the refresh token. If the request to access the online banking account associated with the customer of the financial institution is valid, the online banking computing platform may provide, to the computing platform associated with the third-party financial account information aggregator, financial account information associated with the online banking account associated with the customer of the financial institution via at least one web service.

In some embodiments, the at least one web service may implement a custom application programming interface that enables the computing platform associated with the third-party financial account information aggregator to access the financial account information associated with the online banking account associated with the customer of the financial institution.

In some embodiments, the online banking account may be associated with one or more financial accounts which are maintained for the customer by the financial institution, and the system may be operated by the financial institution. In some instances, the computing platform associated with the third-party financial account information aggregator may be configured to collect information associated with the one or more financial accounts which are maintained for the customer by the financial institution and may be further configured to collect information associated with one or more other financial accounts which are maintained for the customer by one or more other financial institutions different from the financial institution operating the system.

In some embodiments, prompting the customer of the financial institution to authorize the third-party financial account information aggregator to access the information associated with the online banking account associated with the customer of the financial institution may include: sending, via the communication interface, and to a computing device associated with the customer of the financial institution, an authorization prompt message that includes a prompt for the customer of the financial institution to allow the third-party financial account information aggregator to access the information associated with the online banking account; and receiving, via the communication interface, and from the computing device associated with the customer of the financial institution, an authorization response message that includes a response to the prompt included in the authorization prompt message.

In some embodiments, if the customer of the financial institution does not authorize the third-party financial account information aggregator to access the information associated with the online banking account associated with the customer of the financial institution, the online banking computing platform may send, via the communication interface, and to the computing platform associated with the third-party financial account information aggregator, an error message.

In some embodiments, the request to access the online banking account associated with the customer of the financial institution may include a copy of the refresh token. In some instances, validating the request to access the online banking account associated with the customer of the financial institution based on the refresh token may include validating the copy of the refresh token included in the request to access the online banking account associated with the customer of the financial institution.

In some embodiments, prior to providing the financial account information associated with the online banking account associated with the customer of the financial institution via at least one web service, the online banking computing platform may send, via the communication interface, and to the computing platform associated with the third-party financial account information aggregator, an access token, based on validating the copy of the refresh token included in the request to access the online banking account associated with the customer of the financial institution. In some instances, the access token may be configured to enable the computing platform associated with the third-party financial account information aggregator to authenticate with and obtain information from the at least one web service.

In some embodiments, validating the copy of the refresh token included in the request to access the online banking account associated with the customer of the financial institution may include determining that the request to access the online banking account associated with the customer of the financial institution is not valid based on revocation information indicating that the customer has revoked the third-party financial account information aggregator's authorization to access the information associated with the online banking account associated with the customer of the financial institution. In some instances, the customer may have revoked the third-party financial account information aggregator's authorization to access the information associated with the online banking account associated with the customer of the financial institution via an online banking user interface.

In some embodiments, if the request to access the online banking account associated with the customer of the financial institution is not valid, the online banking computing platform may send, via the communication interface, and to the computing platform associated with the third-party financial account information aggregator, an error message.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4K depict an illustrative event sequence for providing access to account information using authentication tokens in accordance with one or more example embodiments;

FIGS. 5A-5J depict another illustrative event sequence for providing access to account information using authentication tokens in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
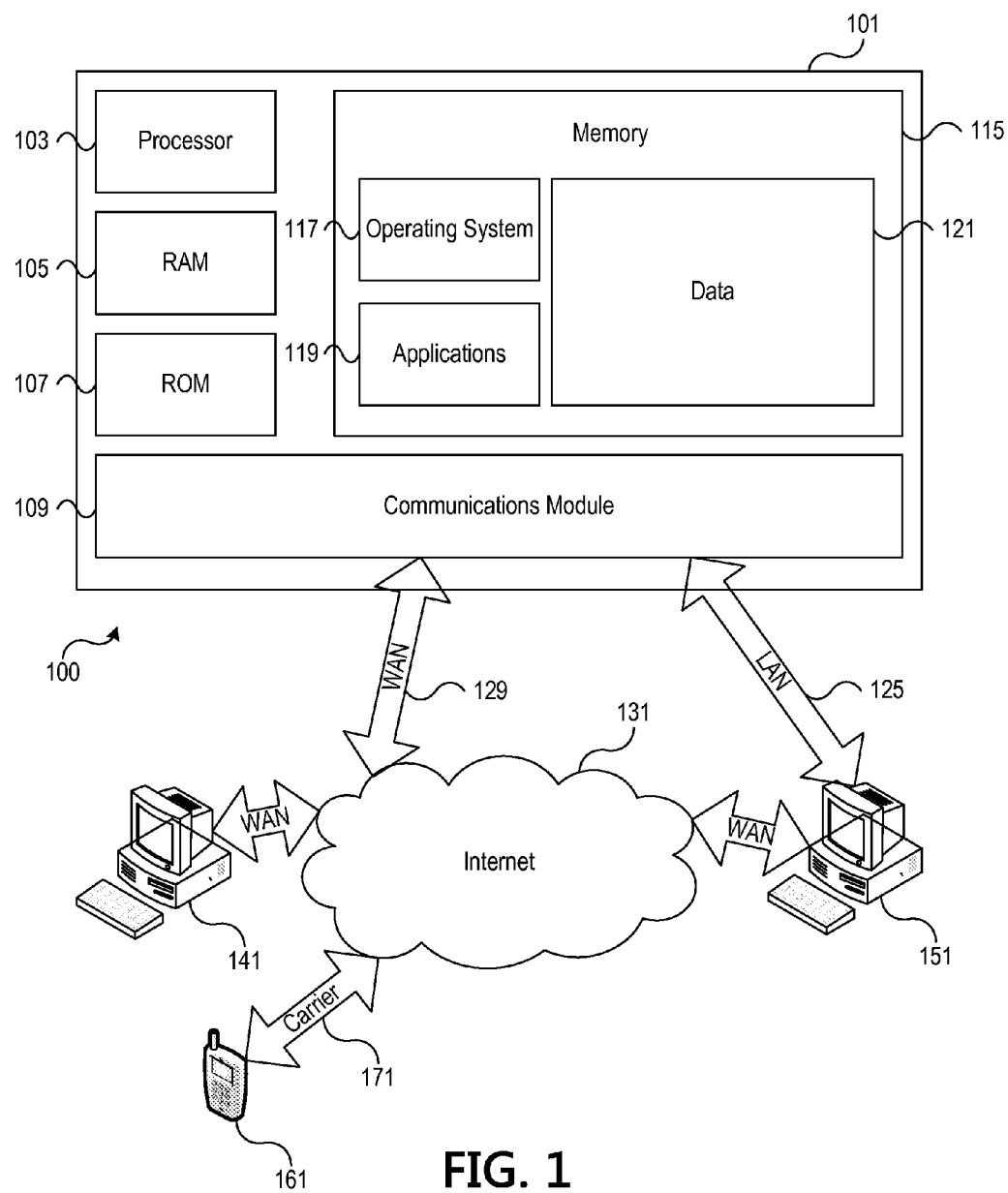
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
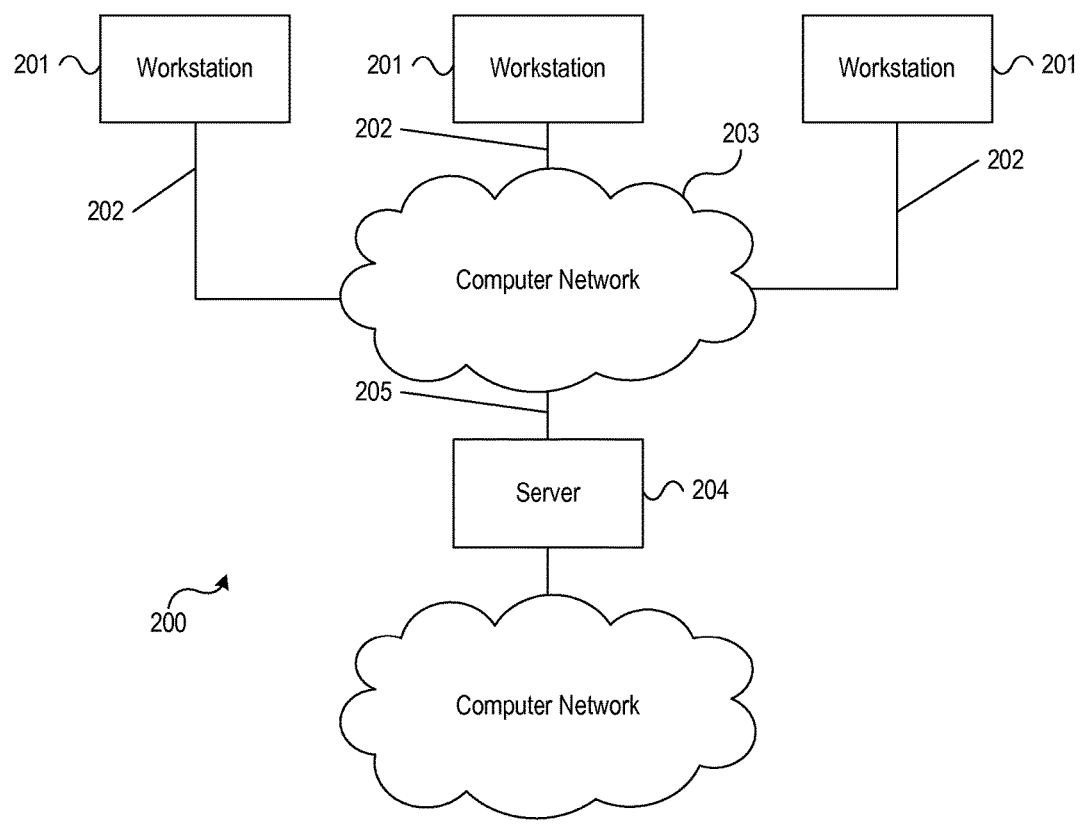
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
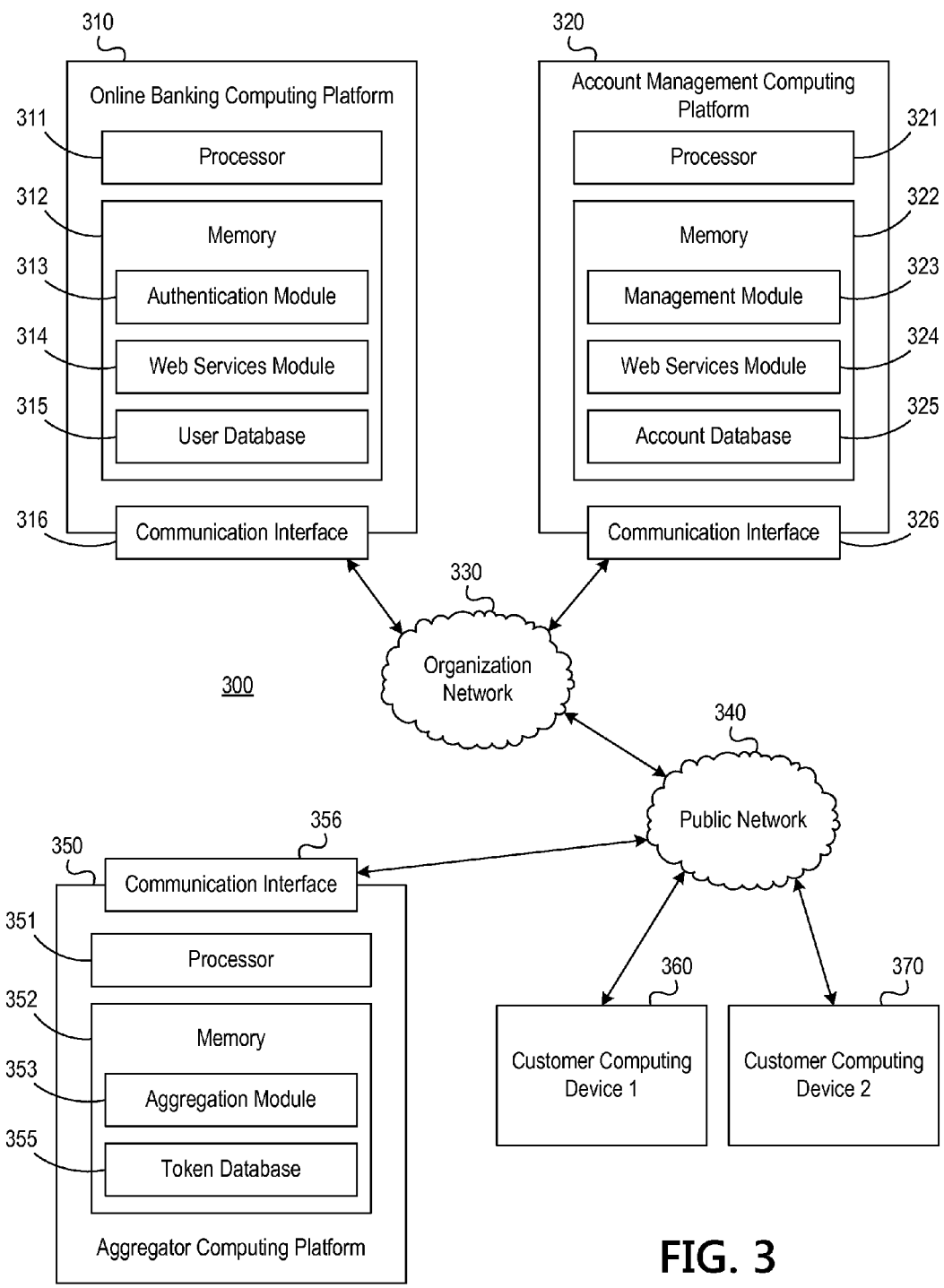
FIG. 3 depicts an illustrative computing environment for providing access to account information using authentication tokens in accordance with one or more example embodiments.

FIG. 3 depicts an illustrative computing environment for providing access to account information using authentication tokens in accordance with one or more example embodiments. Referring to FIG. 3, computing environment 300 may include one or more computing devices. For example, computing environment 300 may include a first customer computing device 360 and a second customer computing device 370. Customer computing device 360 may, for example, be used by and/or configured to be used by a first customer of an organization, such as a financial institution, and customer computing device 370 may, for example, be used by and/or configured to be used by a second customer of the organization different from the first customer of the organization. In some instances, customer computing device 360 and/or customer computing device 370 may store, execute, and/or otherwise include a mobile banking application and/or other mobile banking software (which may, e.g., enable the user of customer computing device 360 and/or the user of customer computing device 370 to view account balance information, transaction history information, or the like). Such a mobile banking application and/or other mobile banking software may, for instance, be provided by a financial institution which may maintain one or more financial accounts for the user of customer computing device 360 and/or for the user of customer computing device 370 and which may operate one or more of the computer systems and/or other elements included in computing environment 300, as illustrated in greater detail below.

Customer computing device 360 and customer computing device 370 may be any type of computing device capable of receiving a user interface, receiving input via the user interface, and communicating the received input to one or more other computing devices. For example, customer computing device 360 and customer computing device 370 may be a server computer, a desktop computer, laptop computer, tablet computer, smart phone, or the like. As noted above, and as illustrated in greater detail below, any and/or all of customer computing device 360 and customer computing device 370 may, in some instances, be special-purpose computing devices configured to perform specific functions.

Computing environment 300 also may include one or more computing platforms. For example, computing environment 300 may include online banking computing platform 310, account management computing platform 320, and aggregator computing platform 350. Online banking computing platform 310 may include one or more computing devices configured to perform one or more of the functions described herein. For example, online banking computing platform 310 may include one or more computers (e.g., laptop computers, desktop computers, servers, server blades, or the like). Similarly, account management computing platform 320 may include one or more computing devices configured to perform one or more of the functions described herein. For example, account management computing platform 320 may include one or more computers (e.g., laptop computers, desktop computers, servers, server blades, or the like). Similarly, aggregator computing platform 350 may include one or more computing devices configured to perform one or more of the functions described herein. For example, aggregator computing platform 350 may include one or more computers (e.g., laptop computers, desktop computers, servers, server blades, or the like).

Computing environment 300 also may include one or more networks, which may interconnect one or more of online banking computing platform 310, account management computing platform 320, aggregator computing platform 350, customer computing device 360, and customer computing device 370. For example, computing environment 300 may include organization network 330 and public network 340. Organization network 330 and/or public network 340 may include one or more sub-networks (e.g., LANs, WANs, or the like). Organization network 330 may be associated with a particular organization (e.g., a corporation, financial institution, educational institution, governmental institution, or the like) and may interconnect one or more computing devices associated with the organization. For example, online banking computing platform 310 and account management computing platform 320 may be associated with an organization (e.g., a financial institution), and organization network 330 may be associated with and/or operated by the organization, and may include one or more networks (e.g., LANs, WANs, VPNs, or the like) that interconnect online banking computing platform 310 and account management computing platform 320 and one or more other computing devices and/or computer systems that are used by, operated by, and/or otherwise associated with the organization. Public network 340 may connect organization network 330 and/or one or more computing devices connected thereto (e.g., online banking computing platform 310, account management computing platform 320) with one or more networks and/or computing devices that are not associated with the organization. For example, aggregator computing platform 350, customer computing device 360, and customer computing device 370 might not be associated with an organization that operates organization network 330 (e.g., because aggregator computing platform 350, customer computing device 360, and customer computing device 370 may be owned and/or operated by entities different from the organization that operates organization network 330, rather than being owned and/or operated by the organization itself or an employee or affiliate of the organization), and public network 340 may include one or more networks (e.g., the internet) that connect aggregator computing platform 350, customer computing device 360, and customer computing device 370 to organization network 330 and/or one or more computing devices connected thereto (e.g., online banking computing platform 310, account management computing platform 320).

Online banking computing platform 310 may include one or more processor(s) 311, memory 312, and communication interface 316. A data bus may interconnect processor(s) 311, memory 312, and/or communication interface 316. Communication interface 316 may be a network interface configured to support communication between online banking computing platform 310 and organization network 330 and/or one or more sub-networks thereof. Memory 312 may include one or more program modules having instructions that when executed by processor(s) 311 cause online banking computing platform 310 to perform one or more functions described herein and/or one or more databases that may store and/or otherwise maintain information which may be used by such program modules and/or processor(s) 311. For example, memory 312 may include authentication module 313, which may include instructions that when executed by processor(s) 311 cause online banking computing platform 310 to perform one or more functions described herein, such as instructions for providing access to account information using authentication tokens, as illustrated in greater detail below. For instance, authentication module 313 may be configured to authenticate one or more customers of the organization (e.g., the financial institution operating online banking computing platform 310) who may, for instance, be using one or more remote computing devices to connect to one or more customer portals and/or other sites provided by online banking computing platform 310. Additionally or alternatively, authentication module 313 may be configured to generate and/or provide one or more authentication tokens. In addition, memory 312 may include web services module 314 and user database 315. Web services module 314 may, for example, include instructions that when executed by processor(s) 311 cause online banking computing platform 310 to provide one or more online banking interfaces via which financial account information may be provided to one or more remote computing devices. Additionally or alternatively, web services module 314 may, for example, include instructions that when executed by processor(s) 311 cause online banking computing platform 310 to accept and/or validate one or more tokens and provide account information to one or more account information aggregators based on accepting and/or validating such tokens. User database 315 may store valid login credentials for one or more customers of the organization (e.g., the financial institution operating online banking computing platform 310) and/or information defining one or more authentication tokens that may have been generated by online banking computing platform 310 and/or other information associated with authentication tokens.

Account management computing platform 320 may include one or more processor(s) 321, memory 322, and communication interface 326. A data bus may interconnect processor(s) 321, memory 322, and/or communication interface 326. Communication interface 326 may be a network interface configured to support communication between account management computing platform 320 and organization network 330 and/or one or more sub-networks thereof. Memory 322 may include one or more program modules having instructions that when executed by processor(s) 321 cause account management computing platform 320 to perform one or more functions described herein and/or one or more databases that may store and/or otherwise maintain information which may be used by such program modules and/or processor(s) 321. For example, memory 322 may include account management module 323, which may include instructions that when executed by processor(s) 321 cause account management computing platform 320 to perform one or more functions described herein, such as instructions for causing one or more transactions to be performed on one or more financial accounts and/or otherwise executed with respect to one or more financial accounts for which account management computing platform 320 may maintain account information, including account balance information and transaction history information, as illustrated in greater detail below. Additionally or alternatively, account management module 323 may include instructions that when executed by processor(s) 321 cause account management computing platform 320 to provide financial account information, such as account balance information and/or transaction history information, to online banking computing platform 310 (e.g., in response to one or more queries that may be received by account management computing platform 320 from online banking computing platform 310, on a periodic basis, and/or the like). In addition, memory 322 may include web services module 324 and account database 325. Web services module 324 may, for example, include instructions that when executed by processor(s) 321 cause account management computing platform 320 to accept and/or validate one or more tokens and provide account information to one or more account information aggregators based on accepting and/or validating such tokens. Account database 325 may store and/or maintain information about one or more financial accounts (e.g., one or more account numbers, one or more account balances, transaction histories, accountholder information, such as name and/or address information, and/or the like) that may be maintained by an organization (e.g., a financial institution) operating account management computing platform 320, and such financial accounts may be maintained by the organization for one or more customers of the organization.

Aggregator computing platform 350 may include one or more processor(s) 351, memory 352, and communication interface 356. A data bus may interconnect processor(s) 351, memory 352, and/or communication interface 356. Communication interface 356 may be a network interface configured to support communication between aggregator computing platform 350 and public network 340. Memory 352 may include one or more program modules having instructions that when executed by processor(s) 351 cause aggregator computing platform 350 to perform one or more functions described herein and/or one or more databases that may store and/or otherwise maintain information which may be used by such program modules and/or processor(s) 351. For example, memory 352 may include aggregation module 353 and token database 355. Aggregation module 353 may include instructions that when executed by processor(s) 351 cause aggregator computing platform 350 to perform one or more functions described herein, such as instructions for accessing one or more customer portals provided by one or more financial institutions using one or more authentication tokens to collect and/or present aggregated financial account information to one or more users, as illustrated in greater detail below. Token database 355 may, for example, store and/or maintain one or more authentication tokens provided by one or more financial institutions and/or one or more computer systems associated with such financial institutions, including one or more tokens and/or other information which may enable aggregator computing platform 350 to access one or more customer portals provided by one or more financial institutions on behalf of one or more users.

Figure 4A:
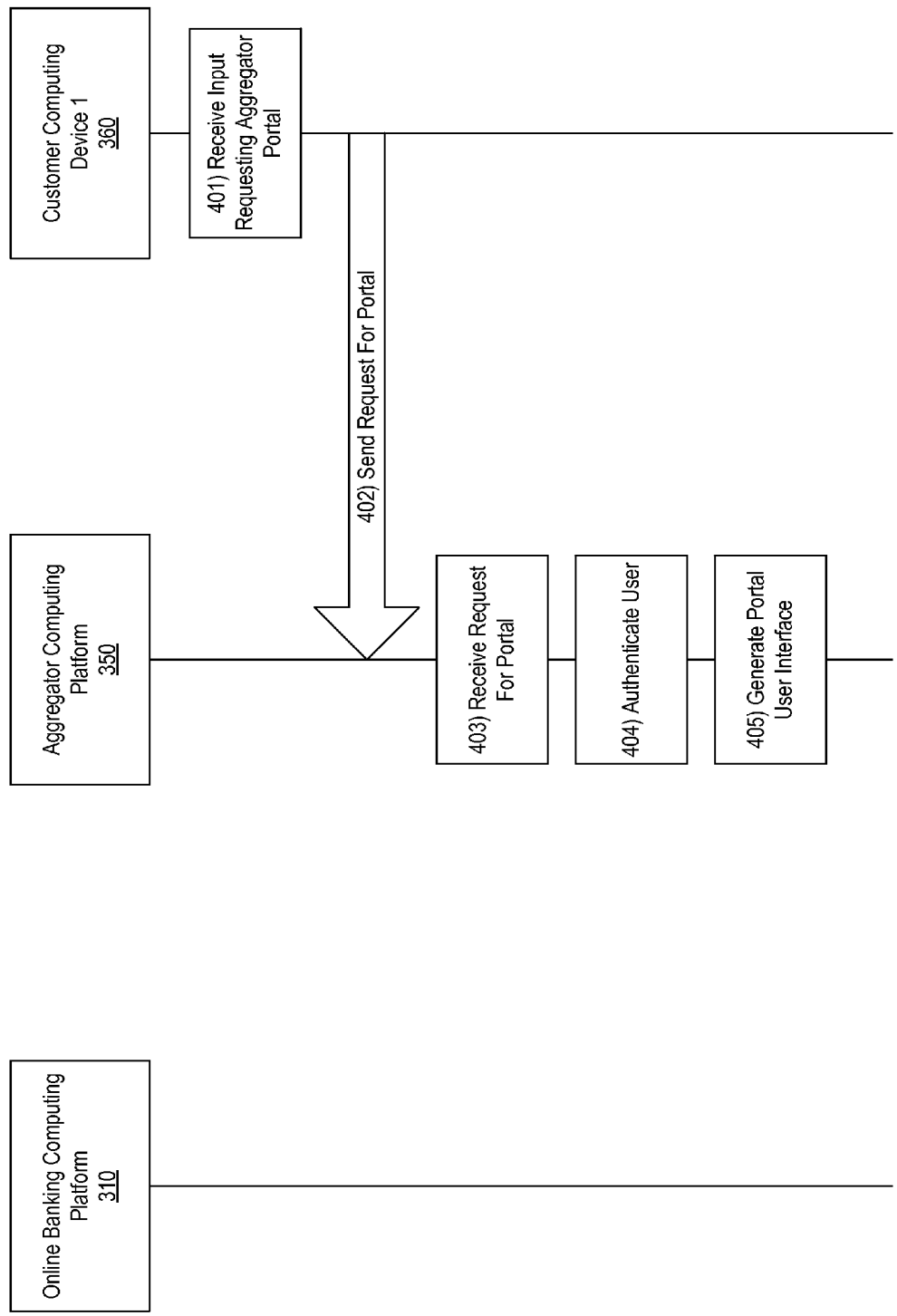

FIGS. 4A-4K depict an illustrative event sequence for providing access to account information using authentication tokens in accordance with one or more example embodiments. Referring to FIG. 4A, at step 401, customer computing device 360 may receive input requesting an aggregator portal. For example, at step 401, customer computing device 360 may receive input (e.g., from the user of customer computing device 360, who may, e.g., be a customer of the financial institution operating online banking computing platform 310, as illustrated in greater detail below) requesting to access and/or view an aggregator portal (which may, e.g., be provided by an account information aggregator that operates and/or is otherwise associated with aggregator computing platform 350, as illustrated in greater detail below). At step 402, customer computing device 360 may send a request for an aggregator portal interface to aggregator computing platform 350. At step 403, aggregator computing platform 350 may receive the request for the aggregator portal interface from customer computing device 360.

At step 404, aggregator computing platform 350 may authenticate customer computing device 360 and/or the user of customer computing device 360. For example, at step 404, aggregator computing platform 350 may prompt the user of customer computing device 360 to provide one or more login credentials that may be associated with a user account of the user of customer computing device 360 that is maintained by the account information aggregator operating aggregator computing platform 350, and aggregator computing platform 350 may subsequently validate the one or more credentials provided by the user of customer computing device 360 before providing access to an aggregator portal (which may, e.g., be hosted, served, and/or otherwise provided by aggregator computing platform 350). In some instances, if the user of customer computing device 360 does not already have a user account with the account information aggregator operating aggregator computing platform 350, aggregator computing platform 350 may enable the user of customer computing device 360 to create a new user account for use with the account information aggregator (e.g., by generating, sending, and/or otherwise providing one or more webpages and/or other user interfaces to customer computing device 360 and/or the user of customer computing device 360).

Figure 4B:
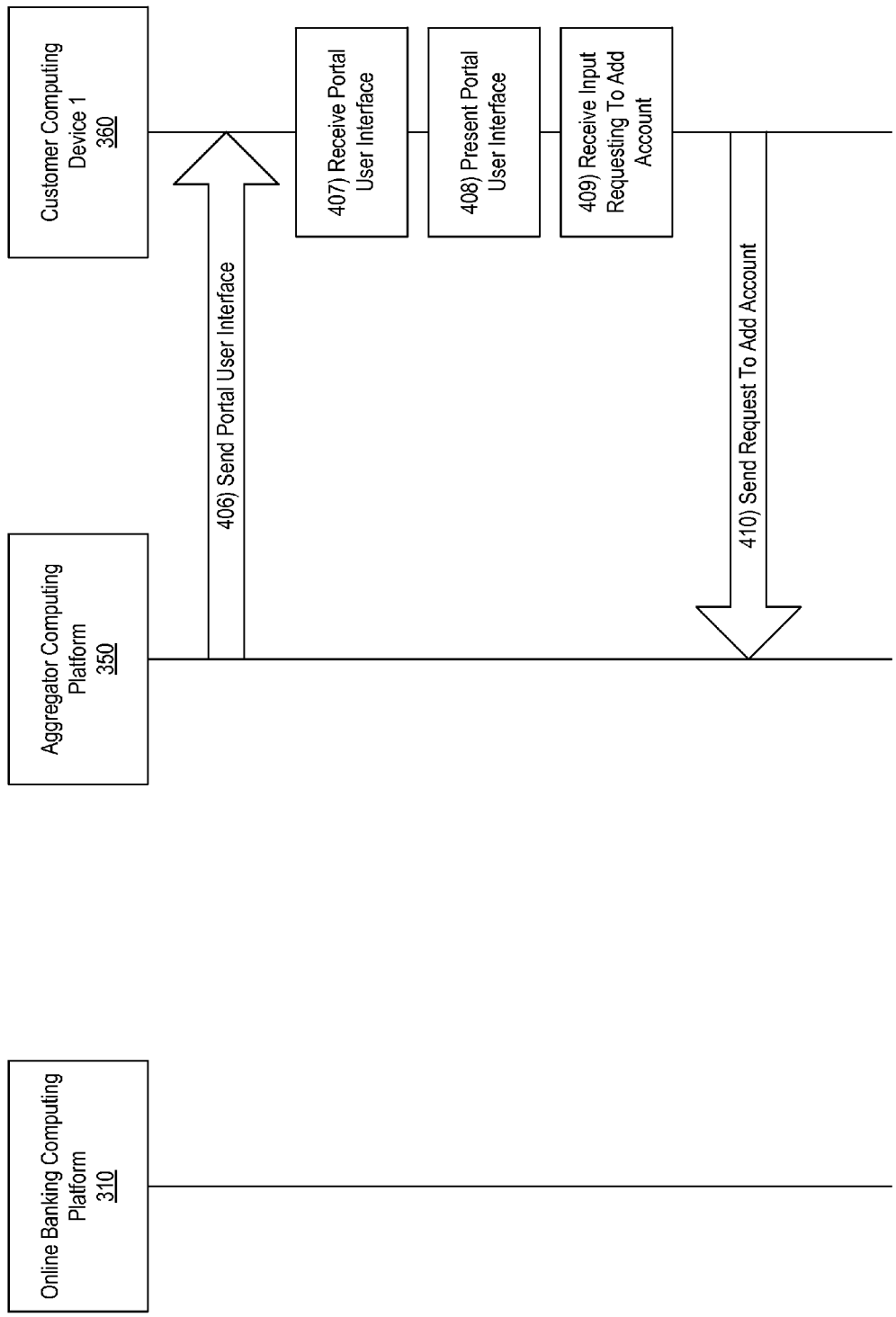

At step 405, aggregator computing platform 350 may generate an aggregator portal user interface. For example, after authenticating customer computing device 360 and/or the user of customer computing device 360, aggregator computing platform 350 may generate one or more webpages and/or other user interfaces that include account information collected by the account information aggregator for the user of customer computing device 360 and/or other information associated with the account information aggregator. Referring to FIG. 4B, at step 406, aggregator computing platform 350 may send the aggregator portal user interface to customer computing device 360. At step 407, customer computing device 360 may receive the aggregator portal user interface from aggregator computing platform 350. At step 408, customer computing device 360 may present the aggregator portal user interface. For example, in presenting the aggregator portal user interface, customer computing device 360 may display, cause to be displayed, and/or otherwise present a graphical user interface similar to graphical user interface 600, which is illustrated in FIG. 6.

Figure 6:
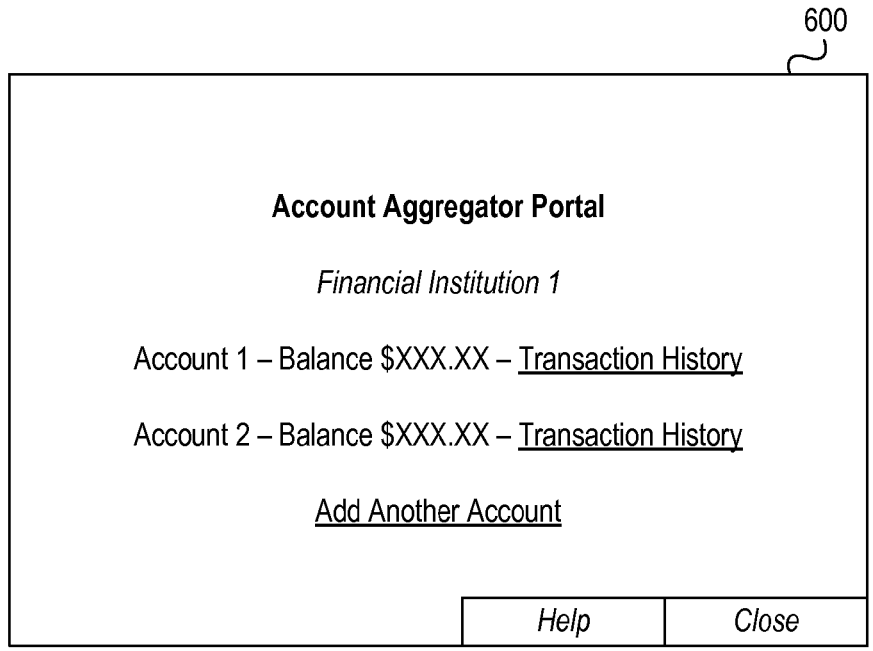
FIGS. 6-12 depict example graphical user interfaces for providing access to account information using authentication tokens in accordance with one or more example embodiments.

As seen in FIG. 6, graphical user interface 600 may include financial account information that has been collected, compiled, and/or otherwise aggregated by the account information aggregator operating aggregator computing platform 350 and/or other information presented by aggregator computing platform 350 as part of the aggregator portal user interface. For example, graphical user interface 600 may include account balance information for one or more accounts that may be maintained by a financial institution (which may, e.g., be different from the account information aggregator operating aggregator computing platform 350), one or more links to view transaction history information for the one or more accounts, one or more links that allow the user of customer computing device 360 to add one or more new financial accounts to the aggregator portal user interface, and/or one or more other links, buttons, and/or other controls that allow the user of customer computing device 360 to perform other functions associated with the aggregator portal user interface.

Figure 4C:
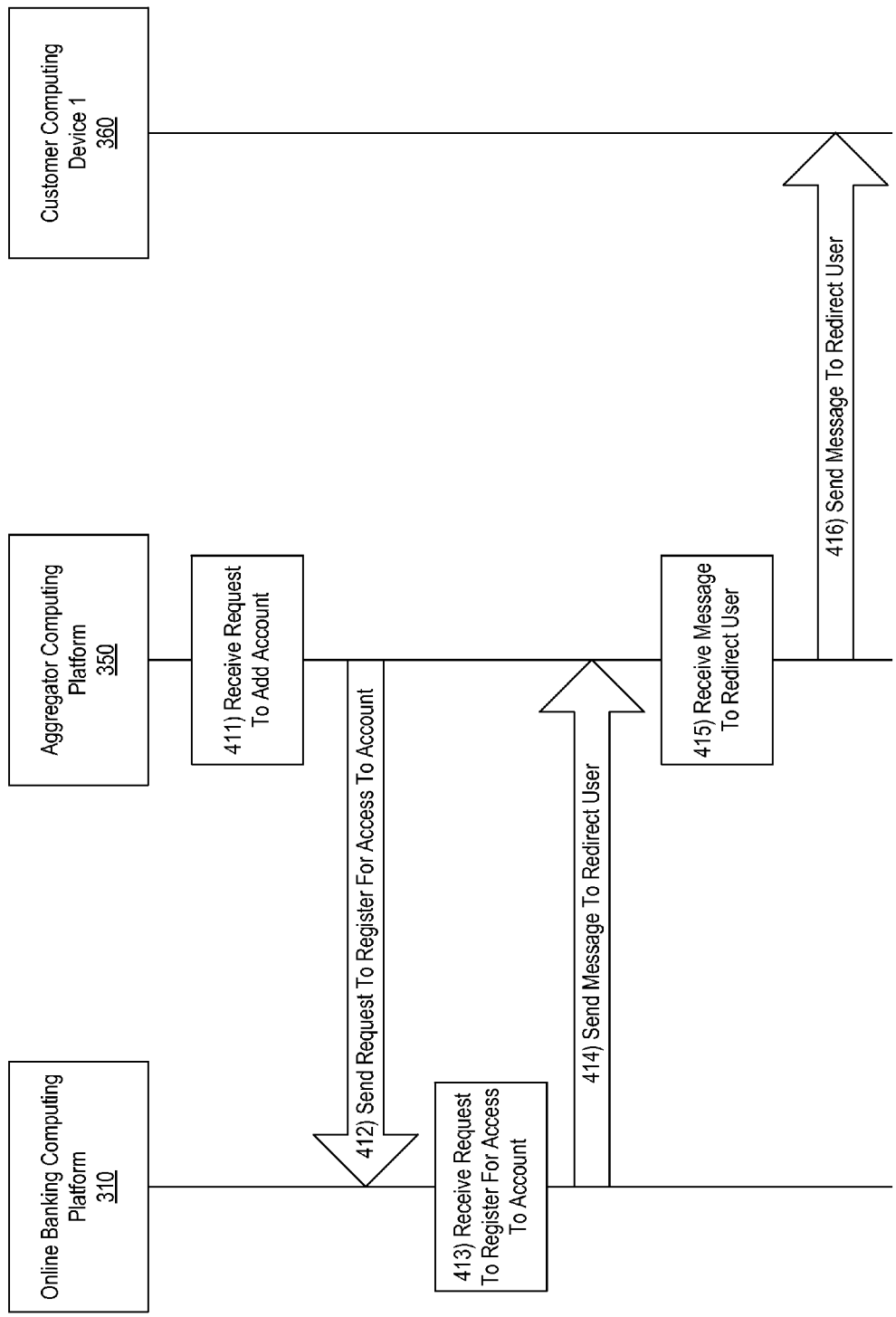

Referring again to FIG. 4B, at step 409, customer computing device 360 may receive input requesting to add a new account to the aggregator portal user interface provided by aggregator computing platform 350. For example, at step 409, customer computing device 360 may receive input from the user of customer computing device 360 requesting to add a new account to the aggregator portal user interface provided by aggregator computing platform 350. Such input may, for instance, include information identifying the new account to be added, the financial institution that provides the account and/or is otherwise associated with the account, and/or other information associated with the request. In the example illustrated here, for instance, the input received at step 409 may, for example, include information requesting to add a new account that is provided by and/or otherwise associated with the financial institution that may operate online banking computing platform 310. At step 410, customer computing device 360 may send a request to add a new financial account to the aggregator portal user interface to aggregator computing platform 350. Such a request may, for instance, include any and/or all of the information received from the user of customer computing device 360, including the information identifying the new account to be added and/or the information identifying the financial institution associated with the new account to be added. Referring to FIG. 4C, at step 411, aggregator computing platform 350 may receive the request to add a new financial account to the aggregator portal user interface from customer computing device 360. At step 412, aggregator computing platform 350 may send a request to register for access to the new financial account to online banking computing platform 310. For example, at step 412, after determining that the new financial account is maintained by, provided by, and/or otherwise associated with the financial institution that may operate online banking computing platform 310, aggregator computing platform 350 may send a request to register for access to the financial account to online banking computing platform 310.

At step 413, online banking computing platform 310 may receive the request to register for access from aggregator computing platform 350. For example, at step 413, online banking computing platform 310 may receive, via a communication interface (e.g., communication interface 316), and from a computing platform associated with a third-party financial account information aggregator (e.g., aggregator computing platform 350), a request to register for access to an online banking account associated with a customer of a financial institution. In some embodiments, the online banking account may be associated with one or more financial accounts which are maintained for the customer by the financial institution, and the system (e.g., online banking computing platform 310) may be operated by the financial institution that maintains the one or more financial accounts for the customer. For example, the online banking account (e.g., for which the request to register for access is received at step 413) may be a user account that is used for accessing a customer portal provided by the financial institution that may operate online banking computing platform 310, and the user account may provide access to and/or be otherwise associated with one or more financial accounts that the financial institution may maintain for the customer (who may, e.g., be the user of customer computing device 360).

In some embodiments, the computing platform associated with the third-party financial account information aggregator may be configured to collect information associated with the one or more financial accounts which are maintained for the customer by the financial institution and may be further configured to collect information associated with one or more other financial accounts which are maintained for the customer by one or more other financial institutions different from the financial institution operating the system (e.g., online banking computing platform 310). For example, the computing platform associated with the third-party financial account information aggregator (e.g., aggregator computing platform 350) may be configured to collect information associated with the one or more financial accounts which are maintained for the customer by the financial institution operating online banking computing platform 310 and may be further configured to collect information associated with one or more other financial accounts which are maintained for the customer by one or more other financial institutions different from the financial institution operating online banking computing platform 310. In this way, the account information aggregator (which may, e.g., operate aggregator computing platform 350) may provide the user of customer computing device 360 with one or more aggregator portal user interfaces that include account information obtained from the financial institution operating online banking computing platform 310, as well as account information obtained from one or more other financial institutions with which the user of customer computing device 360 may maintain one or more financial accounts.

At step 414, online banking computing platform 310 may send to aggregator computing platform 350 a message to redirect customer computing device 360 to an authentication prompt. For instance, after receiving the request to register for access from aggregator computing platform 350 (e.g., at step 413), online banking computing platform 310 may send to aggregator computing platform 350 a message that is configured to cause aggregator computing platform 350 to redirect customer computing device 360 and/or the user of customer computing device 360 to an authentication prompt provided by online banking computing platform 310 and/or the financial institution operating online banking computing platform 310.

For example, based on receiving the request to register for access to the online banking account associated with the customer of the financial institution, online banking computing platform 310 may prompt the customer of the financial institution to authorize the third-party financial account information aggregator to access information associated with the online banking account associated with the customer of the financial institution. In particular, online banking computing platform 310 may prompt the customer (who may, e.g., be using customer computing device 360) to authorize access by sending the redirect message (e.g., at step 414) and/or by authenticating and/or prompting the customer (e.g., at step 420 and/or at step 421, as illustrated in greater detail below).

At step 415, aggregator computing platform 350 may receive from online banking computing platform 310 the message to redirect customer computing device 360 to the authentication prompt. At step 416, aggregator computing platform 350 may send a message to customer computing device 360 to redirect customer computing device 360 to an authentication prompt. For example, at step 416, aggregator computing platform 350 may send a message to customer computing device 360 redirecting customer computing device 360 and/or the user of customer computing device 360 to an authentication prompt provided by online banking computing platform 310 and/or provided by the financial institution operating online banking computing platform 310. Referring to FIG. 4D, at step 417, customer computing device 360 may receive from aggregator computing platform 350 the message redirecting customer computing device 360 to the authentication prompt. The message may, for example, include information configured to cause customer computing device 360 to connect to online banking computing platform 310 and/or to request the authentication prompt from online banking computing platform 310. At step 418, customer computing device 360 may send a message to online banking computing platform 310 requesting the authentication prompt.

Figure 7:
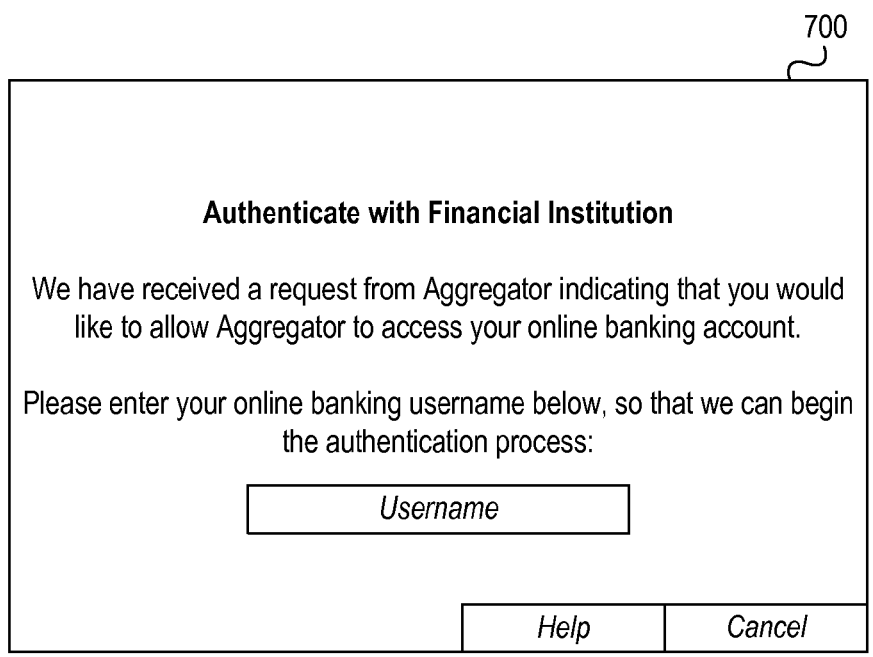

At step 419, online banking computing platform 310 may receive the message requesting the authentication prompt from customer computing device 360. At step 420, online banking computing platform 310 may authenticate the user of customer computing device 360. For example, after receiving the message requesting the authentication prompt from customer computing device 360 (e.g., at step 419), online banking computing platform 310 may authenticate the user of customer computing device 360 by generate and/or send one or more authentication prompts to customer computing device 360 to prompt the user of customer computing device 360 to enter and/or otherwise provide one or more login credentials for verification by online banking computing platform 310, such as a username, password, one-time passcode, one or more biometric inputs (e.g., one or more voice biometrics, fingerprint biometrics, eye scan biometrics, facial scan biometrics, or the like). Such authentication prompts may, for instance, be and/or include one or more webpages and/or other user interfaces (which may, e.g., be generated by online banking computing platform 310, sent to customer computing device 360, and/or presented by customer computing device 360). For example, in authenticating the user of customer computing device 360, online banking computing platform 310 may cause customer computing device 360 to display and/or otherwise present a graphical user interface similar to graphical user interface 700, which is illustrated in FIG. 7. As seen in FIG. 7, graphical user interface 700 may include text and/or other information informing the user that an account information aggregator has requested access to the user's online banking account and/or prompting the user to enter one or more login credentials to be authenticated by the financial institution operating online banking computing platform 310 and/or maintaining the online banking account.

Figure 8:
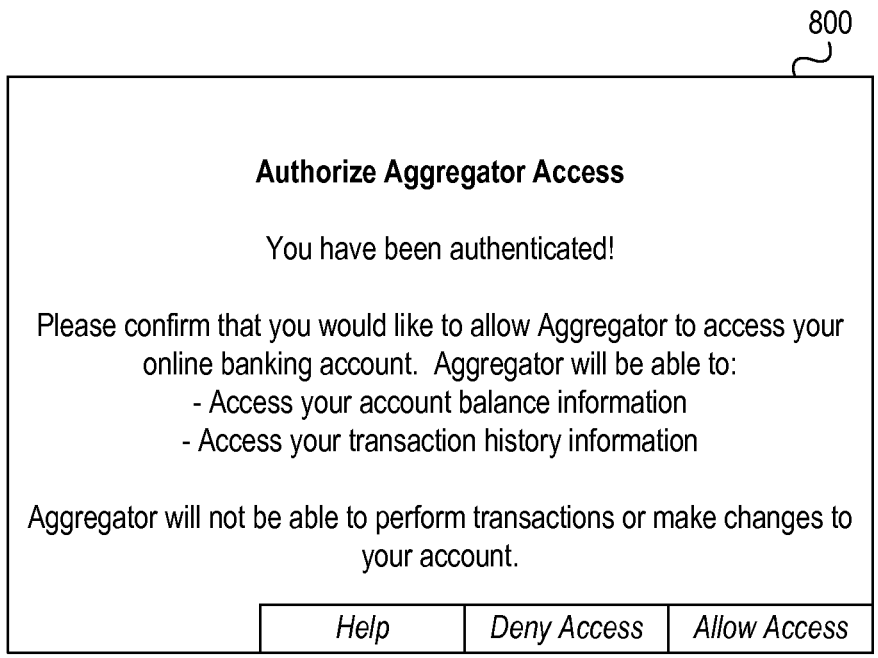

Referring again to FIG. 4D, at step 421, online banking computing platform 310 may prompt the user of customer computing device 360 to authorize the account information aggregator to access the online banking account of the user of customer computing device 360. For example, in prompting the user of customer computing device 360 to authorize the account information aggregator to access the online banking account of the user of customer computing device 360, online banking computing platform 310 may cause customer computing device 360 to display and/or otherwise present a graphical user interface similar to graphical user interface 800, which is illustrated in FIG. 8. As seen in FIG. 8, graphical user interface 800 may include text and/or other information informing the user of customer computing device 360 that they have been authenticated, asking the user to confirm that they would like to allow the account information aggregator operating aggregator computing platform 350 to access their online banking account, and informing the user of what types of access will be provided to the account information aggregator by the financial institution operating online banking computing platform 310 and what types of access will not be provided to the account information aggregator by the financial institution operating online banking computing platform 310. In addition, graphical user interface 800 may include one or more links, buttons, and/or other controls enabling the user of customer computing device 360 to make a selection and/or otherwise provide input indicating whether the user is confirming that they would like to allow the account information aggregator operating aggregator computing platform 350 to access their online banking account and/or denying such access.

In some embodiments, prompting the customer of the financial institution to authorize the third-party financial account information aggregator to access the information associated with the online banking account associated with the customer of the financial institution may include: sending, via the communication interface, and to a computing device associated with the customer of the financial institution, an authorization prompt message comprising a prompt for the customer of the financial institution to allow the third-party financial account information aggregator to access the information associated with the online banking account; and receiving, via the communication interface, and from the computing device associated with the customer of the financial institution, an authorization response message comprising a response to the prompt included in the authorization prompt message. For example, in some instances, in prompting the customer (e.g., the user of customer computing device 360, who may, e.g., be the customer of the financial institution operating online banking computing platform 310 in this example) to authorize the aggregator operating aggregator computing platform 350 to access the information associated with the customer's online banking account, online banking computing platform 310 may send, via communication interface 316, and to customer computing device 360, an authorization prompt message that includes a prompt for the customer (e.g., the user of the customer computing device 360) to allow the aggregator operating aggregator computing platform 350 to access the information associated with the customer's online banking account. Such an authorization prompt message may, for instance, redirect the customer (e.g., the user of customer computing device 360) to a website or one or more webpages provided by the financial institution operating online banking computing platform 310 and/or cause customer computing device 360 to present one or more user interfaces prompting the customer (e.g., the user of customer computing device 360) to authorize access, such as graphical user interface 800, as illustrated above. In addition, in prompting the customer, online banking computing platform 310 may, for example, receive, via communication interface 316, and from customer computing device 360, an authorization response message that includes a response to the prompt included in the authorization response message. Such a response may, for example, include information indicating whether the customer (e.g., the user of customer computing device 360) has made a selection allowing or not allowing the account information aggregator operating aggregator computing platform 350 to access the customer's online banking account and/or other account information (which may, e.g., be maintained by the financial institution operating online banking computing platform 310).

Referring again to FIG. 4D, at step 422, if the user of customer computing device 360 does not authorize the account information aggregator to access the online banking account, online banking computing platform 310 may send an error message to aggregator computing platform 350. For example, if the customer of the financial institution does not authorize the third-party financial account information aggregator to access the information associated with the online banking account associated with the customer of the financial institution (e.g., at step 421), online banking computing platform 310 may send, via communication interface 316, and to the computing platform associated with the third-party financial account information aggregator (e.g., aggregator computing platform 350), an error message. The error message may, for example, indicate that the user of customer computing device 360 has denied access to the aggregator operating aggregator computing platform 350, and the sequence may end or online banking computing platform 310 and/or aggregator computing platform 350 may attempt to re-prompt the user of customer computing device 360 to authorize access for the aggregator operating aggregator computing platform 350.

Figure 4E:
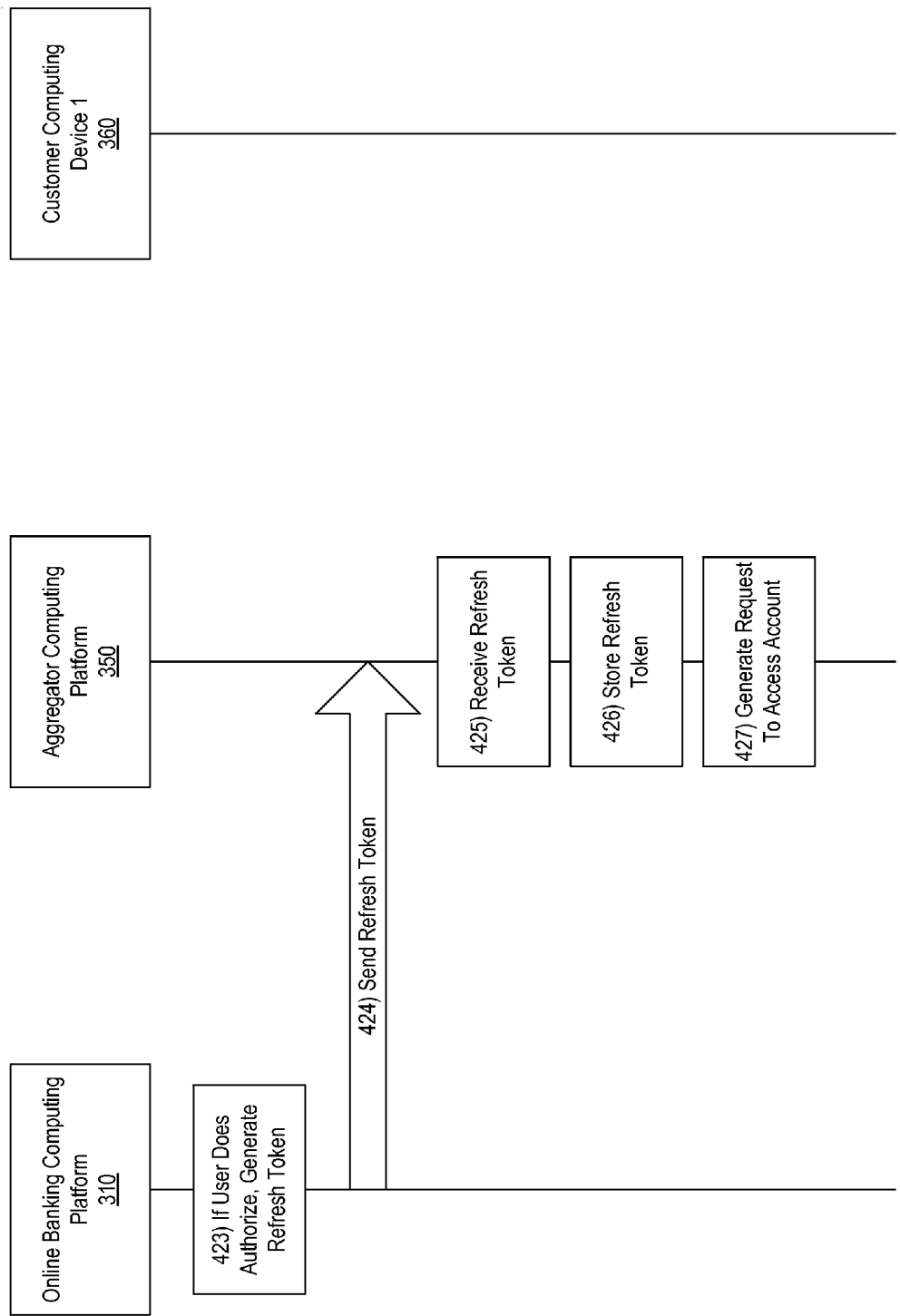

Alternatively, referring to FIG. 4E, at step 423, if the user of customer computing device 360 does authorize the account information aggregator to access the online banking account, online banking computing platform 310 may generate a refresh token. Such a refresh token may, for example, allow aggregator computing platform 350 to request one or more access tokens that each enable a time-limited session in which the aggregator operating aggregator computing platform 350 is able to access the online banking account of the customer (who may, e.g., be using customer computing device 360) and/or information associated with the online banking account (which may, e.g., be provided to aggregator computing platform 350 by online banking computing platform 310), as illustrated in greater detail below. In some instances, online banking computing platform 310 also may send a confirmation message to customer computing device 360 and/or aggregator computing platform 350 indicating that the customer (e.g., the user of customer computing device 360) has successfully authorized the account information aggregator operating aggregator computing platform 350 to access the customer's online banking account via online banking computing platform 310.

At step 424, online banking computing platform 310 may send the refresh token to aggregator computing platform 350. For example, if the customer of the financial institution authorizes the third-party financial account information aggregator to access the information associated with the online banking account associated with the customer of the financial institution (e.g., at step 421), online banking computing platform 310 may send, via communication interface 316, and to the computing platform associated with the third-party financial account information aggregator (e.g., aggregator computing platform 350), a refresh token. For instance, at step 424, online banking computing platform 310 may send the refresh token generated at step 423 to aggregator computing platform 350. As indicated above, the refresh token may, for instance, enable aggregator computing platform 350 to acquire one or more access tokens from online banking computing platform 310 and/or from one or more other computing platforms operated by the financial institution operating online banking computing platform 310 and/or may otherwise enable aggregator computing platform 350 to obtain access to financial account information maintained by the financial institution operating online banking computing platform 310 for the customer (who may, e.g., be using customer computing device 360). In this way, after receiving authorization from the customer (who may, e.g., be using customer computing device 360), online banking computing platform 310 and/or one or more other computer systems associated with the financial institution operating online banking computing platform 310 may generate and send a refresh token to aggregator computing platform 350 that allows the account information aggregator operating aggregator computing platform 350 to obtain access to the customer's online banking account and/or information associated with the customer's online banking account, such as the customer's account balance information, the customer's transaction history information, and/or other financial account information associated with the customer.

At step 425, aggregator computing platform 350 may receive the refresh token from online banking computing platform 310. For example, at step 425, aggregator computing platform 350 may receive the refresh token generated by online banking computing platform 310 after the user of customer computing device 360 authorized the account information aggregator operating aggregator computing platform 350 to access the online banking account of the user of customer computing device 360. At step 426, aggregator computing platform 350 may store the refresh token. For example, at step 426, aggregator computing platform 350 may store the refresh token in token database 355.

At step 427, aggregator computing platform 350 may generate a request to access the online banking account to obtain financial account information associated with the online banking account. For example, at step 427, aggregator computing platform 350 may generate a request to access the online banking account of the user of customer computing device 360 to obtain financial account information for the online banking account, such as account balance information, transaction history information, and/or other financial account information associated with the online banking account of the user of customer computing device 360. In some instances, aggregator computing platform 350 may generate such a request based on input and/or one or more requests received from customer computing device 360 and/or the user of customer computing device 360. For instance, aggregator computing platform 350 may generate such a request on-demand when customer computing device 360 and/or the user of customer computing device 360 requests access to an aggregator portal interface provided by aggregator computing platform 350, as aggregator computing platform 350 may generate the request to obtain updated financial account information from online banking computing platform 310 for inclusion in the aggregator portal interface. In other instances, aggregator computing platform 350 may generate such a request based on a schedule and/or otherwise on a periodic basis. For instance, aggregator computing platform 350 may generate such a request on a periodic basis (e.g., hourly, daily, weekly, or the like) so as to maintain relatively up-to-date information about the online banking account associated with the user of customer computing device 360.

Figure 4F:
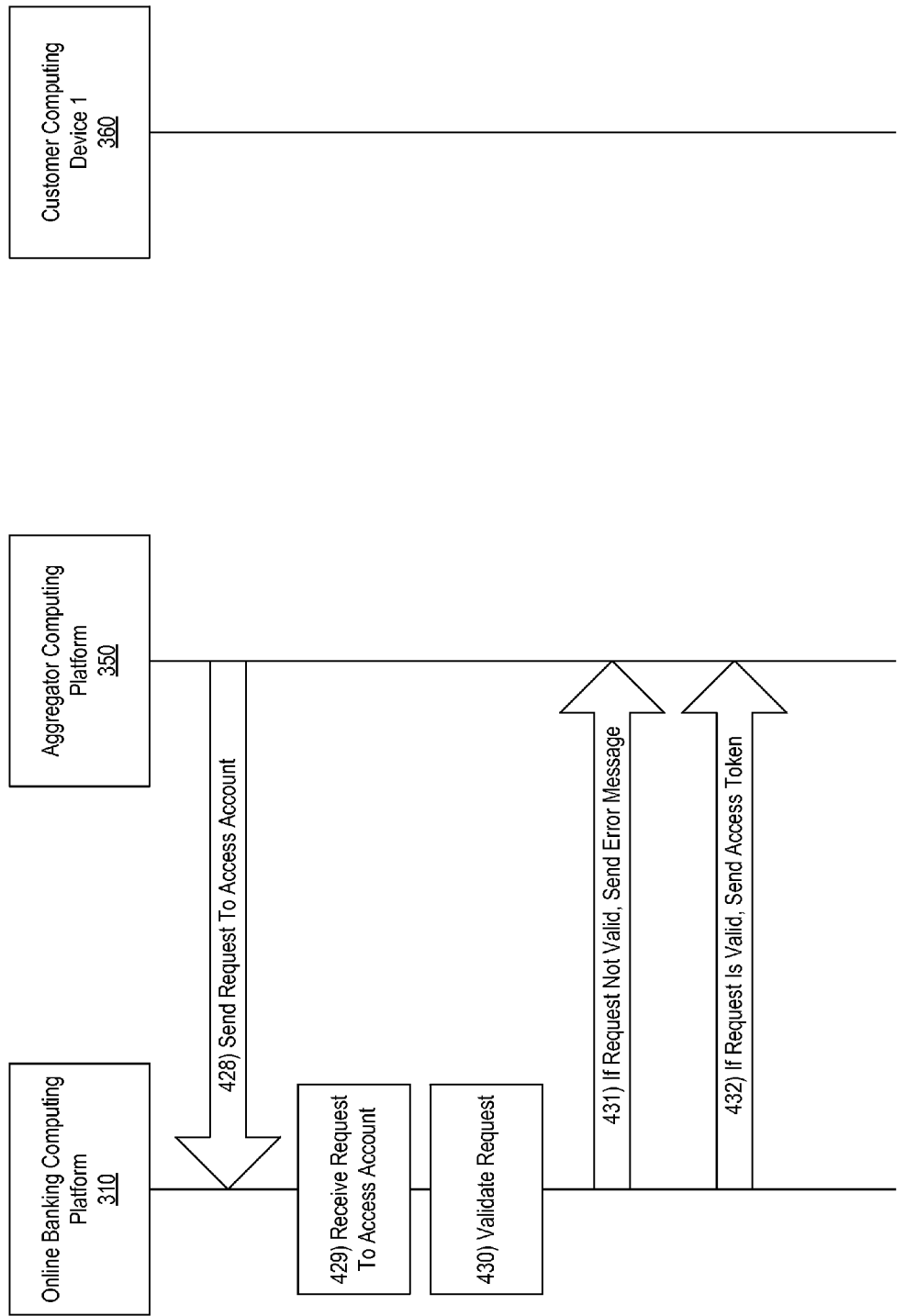

Referring to FIG. 4F, at step 428, aggregator computing platform 350 may send the request to access the online banking account to online banking computing platform 310. At step 429, online banking computing platform 310 may receive the request to access the online banking account from aggregator computing platform 350. For example, after sending the refresh token to the computing platform associated with the third-party financial account information aggregator (e.g., at step 424), online banking computing platform 310 may receive, via communication interface 316, and from the computing platform associated with the third-party financial account information aggregator (e.g., aggregator computing platform 350), a request to access the online banking account associated with the customer of the financial institution. In some embodiments, the request to access the online banking account associated with the customer of the financial institution may include a copy of the refresh token. For example, the request to access the online banking account (which may, e.g., be generated by aggregator computing platform 350 and sent to online banking computing platform 310) may include a copy of the refresh token (which may, e.g., be stored by aggregator computing platform 350 and/or embedded in the request to access the online banking account when generating and/or sending the request to online banking computing platform 310). As illustrated below, aggregator computing platform 350 may, in some instances, provide a copy of the refresh token to online banking computing platform 310 to authenticate with online banking computing platform 310 and/or establish permission to access the online banking account of the user of customer computing device 360.

At step 430, online banking computing platform 310 may validate the request received from aggregator computing platform 350 to access the online banking account. For example, at step 430, online banking computing platform 310 may validate the request to access the online banking account associated with the customer of the financial institution (who may, e.g., be using customer computing device 360) based on the refresh token (e.g., based on the refresh token generated and sent to aggregator computing platform 350 at step 423 and at step 424). In some embodiments, validating the request to access the online banking account associated with the customer of the financial institution based on the refresh token comprises validating the copy of the refresh token included in the request to access the online banking account associated with the customer of the financial institution. For example, in validating the request to access the online banking account of the user of customer computing device 360 (e.g., at step 430), online banking computing platform 310 may validate the copy of the refresh token included in the request (e.g., in instances in which the request includes a copy of the refresh token). In validating the copy of the refresh token included in the request, online banking computing platform 310 may, for instance, check and/or confirm that the copy of the refresh token matches the refresh token that was previously generated by online banking computing platform 310 and/or provided to aggregator computing platform 350 by online banking computing platform 310. Additionally or alternatively, in validating the copy of the refresh token included in the request, online banking computing platform 310 may, for instance, check and/or confirm that the user of customer computing device 360 has not revoked the access privileges of the account information aggregator operating aggregator computing platform 350 with respect to the online banking account of the user of customer computing device 360 and/or otherwise caused the refresh token to be invalidated.

In some instances, validating the copy of the refresh token included in the request to access the online banking account associated with the customer of the financial institution may include determining that the request to access the online banking account associated with the customer of the financial institution is not valid based on revocation information indicating that the customer has revoked the third-party financial account information aggregator's authorization to access the information associated with the online banking account associated with the customer of the financial institution. For example, in some instances, in validating the copy of the refresh token included in the request (e.g., at step 430), online banking computing platform 310 may determine that the request is not valid based on revocation information indicating that the user of customer computing device 360 has revoked the access of the account information aggregator operating aggregator computing platform 350 with respect to the online banking account of the user of customer computing device 360. As illustrated in greater below, the user of customer computing device 360 may revoke the access of the account information aggregator operating aggregator computing platform 350 via an online banking user interface provided by online banking computing platform 310 and/or via one or more other channels and/or interfaces. In some instances, the customer may have revoked the third-party financial account information aggregator's authorization to access the information associated with the online banking account associated with the customer of the financial institution via the online banking user interface that includes the financial account information associated with the online banking account associated with the customer of the financial institution. For example, the user of customer computing device 360 may have revoked the access of the account information aggregator operating aggregator computing platform 350 via an online banking user interface provided by online banking computing platform 310 that includes financial account information associated with the online banking account of the user of customer computing device 360. As illustrated in greater detail below, online banking computing platform 310 may, in some instances, provide customer computing device 360 with one or more user interfaces that enable the user of customer computing device 360 to revoke access from one or more specific account information aggregators via an online banking user interface.

At step 431, if the request to access the online banking account is not valid, online banking computing platform 310 may send an error message to aggregator computing platform 350. For example, if the request to access the online banking account associated with the customer of the financial institution is not valid (e.g., at step 430), online banking computing platform 310 may send, via communication interface 316, and to the computing platform associated with the third-party financial account information aggregator (e.g., aggregator computing platform 350), an error message. Such an error message may, for instance, include information indicating that the request is invalid because the refresh token maintained by aggregator computing platform 350 is invalid, because the user of customer computing device 360 has revoked access to their online banking account, and/or one or more other reasons indicating why the request is invalid.

Alternatively, at step 432, if the request to access the online banking account is valid, online banking computing platform 310 may send an access token to aggregator computing platform 350. For example, if the request to access the online banking account associated with the customer of the financial institution is valid (e.g., at step 430), online banking computing platform 310 may send, via communication interface 316, and to the computing platform associated with the third-party financial account information aggregator (e.g., aggregator computing platform 350), an access token, based on validating the copy of the refresh token included in the request to access the online banking account associated with the customer of the financial institution. As illustrated in greater detail below, the access token may enable aggregator computing platform 350 and/or the account information aggregator operating aggregator computing platform 350 to obtain access to financial account information associated with the online banking account of the user of customer computing device 360. For instance, the access token may enable aggregator computing platform 350 and/or the account information aggregator operating aggregator computing platform 350 to obtain a session cookie that is usable to access an online banking user interface provided by online banking computing platform 310 (e.g., from which aggregator computing platform 350 may extract and/or otherwise obtain financial account information associated with the online banking account, such as by performing a screen scrape, as illustrated in greater detail below).

Figure 4G:
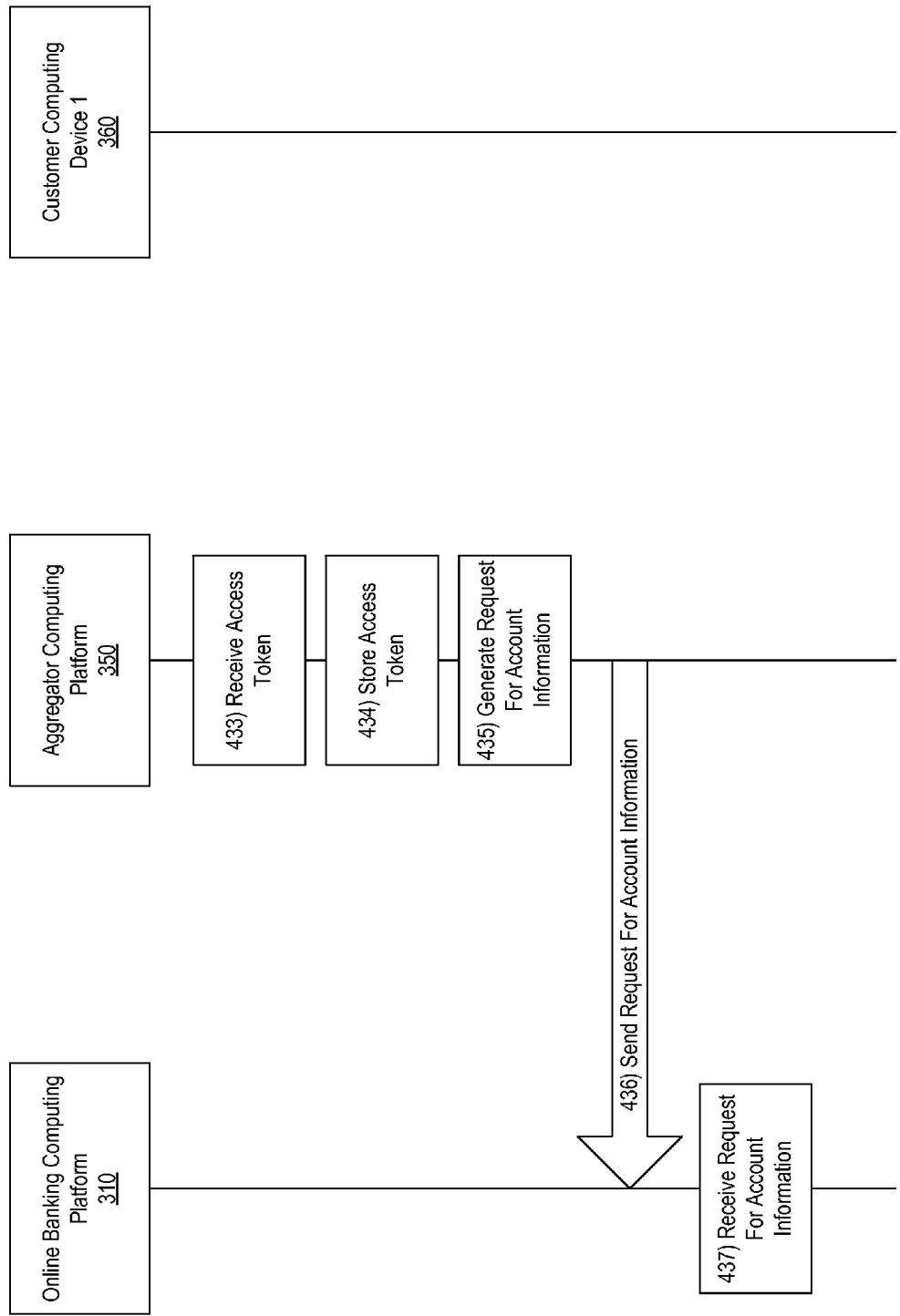

Referring to FIG. 4G, at step 433, aggregator computing platform 350 may receive the access token from online banking computing platform 310. At step 434, aggregator computing platform 350 may store the access token received from online banking computing platform 310. For example, at step 434, aggregator computing platform 350 may store the access token in token database 355. At step 435, aggregator computing platform 350 may generate a request for account information. For example, at step 435, aggregator computing platform 350 may generate an access request message that includes a copy of the access token. At step 436, aggregator computing platform 350 may send the request for account information to online banking computing platform 310. At step 437, online banking computing platform 310 may receive the request for account information from aggregator computing platform 350. For example, at step 437, online banking computing platform 310 may receive, via communication interface 316, and from the computing platform associated with the third-party financial account information aggregator (e.g., aggregator computing platform 350), an access request message comprising a copy of the access token; (which may, e.g., have been generated and sent to aggregator computing platform 350 by online banking computing platform 310 at step 432).

Referring to FIG. 4H, at step 438, online banking computing platform 310 may validate the request for account information received from aggregator computing platform 350. For example, at step 438, online banking computing platform 310 may validate the request for account information by validating the copy of the access token included in the access request message. In validating the copy of the access token included in the request, online banking computing platform 310 may, for instance, check and/or confirm that the copy of the access token matches the access token that was previously generated by online banking computing platform 310 and/or provided to aggregator computing platform 350 by online banking computing platform 310. At step 439, if the request is not valid (e.g., at step 438), online banking computing platform 310 may send an error message to aggregator computing platform 350. Alternatively, if the request is valid (e.g., at step 438), online banking computing platform 310 may, at step 440, send a session cookie to aggregator computing platform 350. For example, based on validating the copy of the access token included in the access request message, online banking computing platform 310 may send, via communication interface 316, and to the computing platform associated with the third-party financial account information aggregator (e.g., aggregator computing platform 350), a session cookie configured to enable access to the online banking user interface that includes the financial account information associated with the online banking account associated with the customer of the financial institution (who may, e.g., be using customer computing device 360). For instance, after validating the access token included in the request, online banking computing platform 310 may provide aggregator computing platform 350 with a session cookie that enables aggregator computing platform 350 to obtain access to an online banking user interface and/or account information associated with the user of customer computing device 360. As illustrated in greater detail below, aggregator computing platform 350 may use this session cookie to access the online banking user interface and/or the account information associated with the user of customer computing device 360 (which may, e.g., enable aggregator computing platform 350 to generate one or more aggregator portal user interfaces that include up-to-date financial account information for the user of customer computing device 360).

Figure 4I:
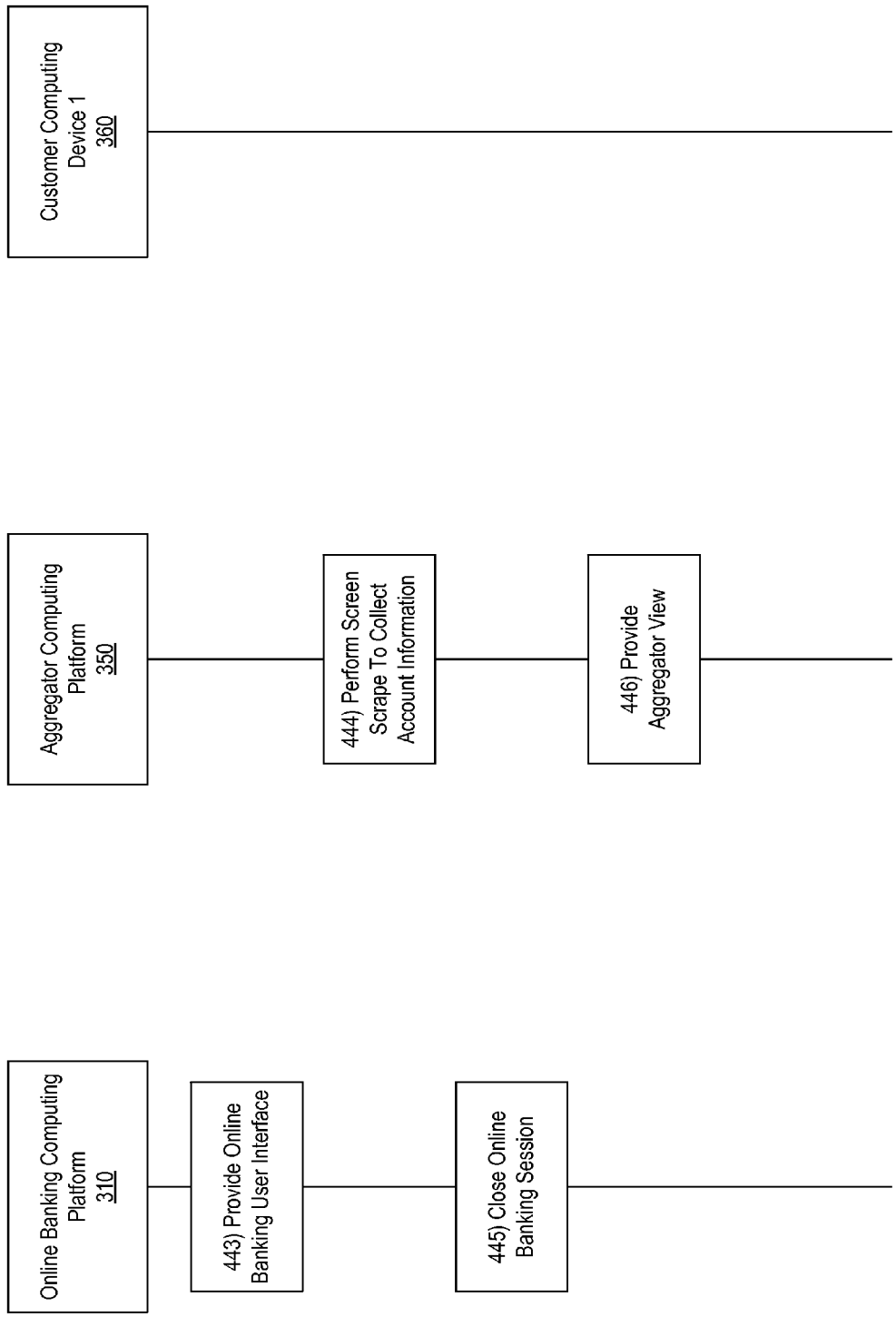

At step 441, aggregator computing platform 350 may receive the session cookie from online banking computing platform 310. At step 442, aggregator computing platform 350 may store the session cookie received from online banking computing platform 310. Referring to FIG. 4I, at step 443, online banking computing platform 310 may provide an online banking user interface (e.g., to aggregator computing platform 350, based on the session cookie). For example, if the request to access the online banking account associated with the customer of the financial institution is valid, online banking computing platform 310 may provide, to the computing platform associated with the third-party financial account information aggregator (e.g., aggregator computing platform 350), an online banking user interface that includes financial account information associated with the online banking account associated with the customer of the financial institution (who may, e.g., be using customer computing device 360). For instance, after validating the refresh token and/or the access token, online banking computing platform 310 may provide an online banking user interface to aggregator computing platform 350 so as to enable aggregator computing platform 350 and/or the account information aggregator operating aggregator computing platform 350 to extract and/or otherwise obtain financial account information for the online banking account of the customer from the online banking user interface. In some instances, aggregator computing platform 350 may, for instance, perform a screen scrape on the online banking user interface provided by online banking computing platform 310 to extract and/or otherwise obtain such financial account information. In some instances, the session cookie provided by online banking computing platform 310 to aggregator computing platform 350 may enable aggregator computing platform 350 to establish and maintain a valid session in the online banking user interface in which such financial account information may be extracted and/or otherwise obtained by aggregator computing platform 350.

In some embodiments, providing the online banking user interface that includes the financial account information associated with the online banking account associated with the customer of the financial institution may include providing read-only access to the online banking user interface by presenting one or more of account balance information and transaction history information via the online banking user interface and preventing one or more transactions from being conducted via the online banking user interface. For example, in providing the online banking user interface, online banking computing platform 310 may provide aggregator computing platform 350 with read-only access to the online banking user interface by presenting account balance information, transaction history information, and/or other information in the online banking user interface, while preventing aggregator computing platform 350 from requesting and/or otherwise conducting one or more transactions via the online banking user interface. In this manner, online banking computing platform 310 and/or the financial institution operating online banking computing platform 310 may provide aggregator computing platform 350 and/or the account information aggregator operating aggregator computing platform 350 with read-only access to the financial account information associated with the online banking account of the user of customer computing device 360.

At step 444, aggregator computing platform 350 may perform a screen scrape to collect account information. For example, at step 444, aggregator computing platform 350 may perform a screen scrape on the online banking user interface provided by online banking computing platform 310 to collect financial account information associated with the online banking account of the user of customer computing device 360. At step 445, online banking computing platform 310 may close the online banking session. For example, at step 445, after aggregator computing platform 350 performs and/or completes the screen scrape and/or disconnects from online banking computing platform 310, online banking computing platform 310 may close the online banking session, discontinue providing the online banking interface, and/or invalidate and/or destroy the access token and/or the session cookie used by aggregator computing platform 350 to access the online banking user interface in connection with the current online banking session.

Figure 9:
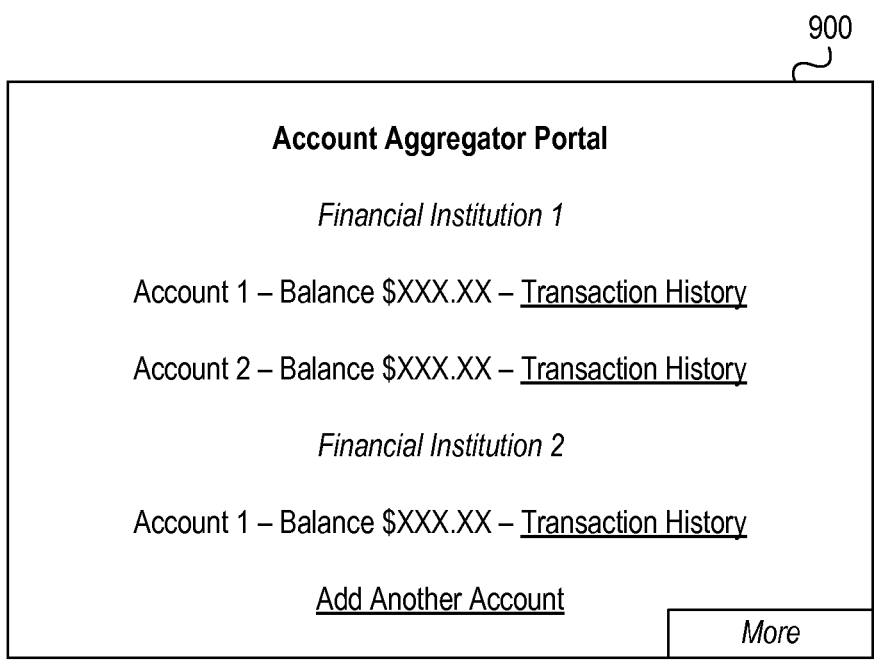

At step 446, aggregator computing platform 350 may provide an aggregator view. For example, at step 446, aggregator computing platform 350 may provide an aggregator portal user interface to customer computing device 360 and/or to the user of customer computing device 360. In providing such an aggregator view, aggregator computing platform 350 may cause customer computing device 360 to display and/or otherwise present a graphical user interface similar to graphical user interface 900, which is illustrated in FIG. 9. As seen in FIG. 9, graphical user interface 900 may include financial account information obtained from online banking computing platform 310 in connection with an online banking account of the user of customer computing device 360 and/or financial account information obtained from one or more other computing platforms associated with one or more other financial institutions in connection with other financial accounts of the user of customer computing device 360 (which may, e.g., maintained by one or more other financial institutions different from the financial institution operating online banking computing platform 310).

In some instances, after granting access to an account information aggregator and/or viewing financial account information via an aggregator portal user interface provided by the account information aggregator, a customer of the financial institution operating online banking computing platform 310 may revoke access from the account information aggregator, such that the account information aggregator might no longer be able to access the online banking account of the customer. The following steps in the example sequence illustrate how the customer using customer computing device 360 may revoke access from the aggregator operating aggregator computing platform 350.

Figure 4J:
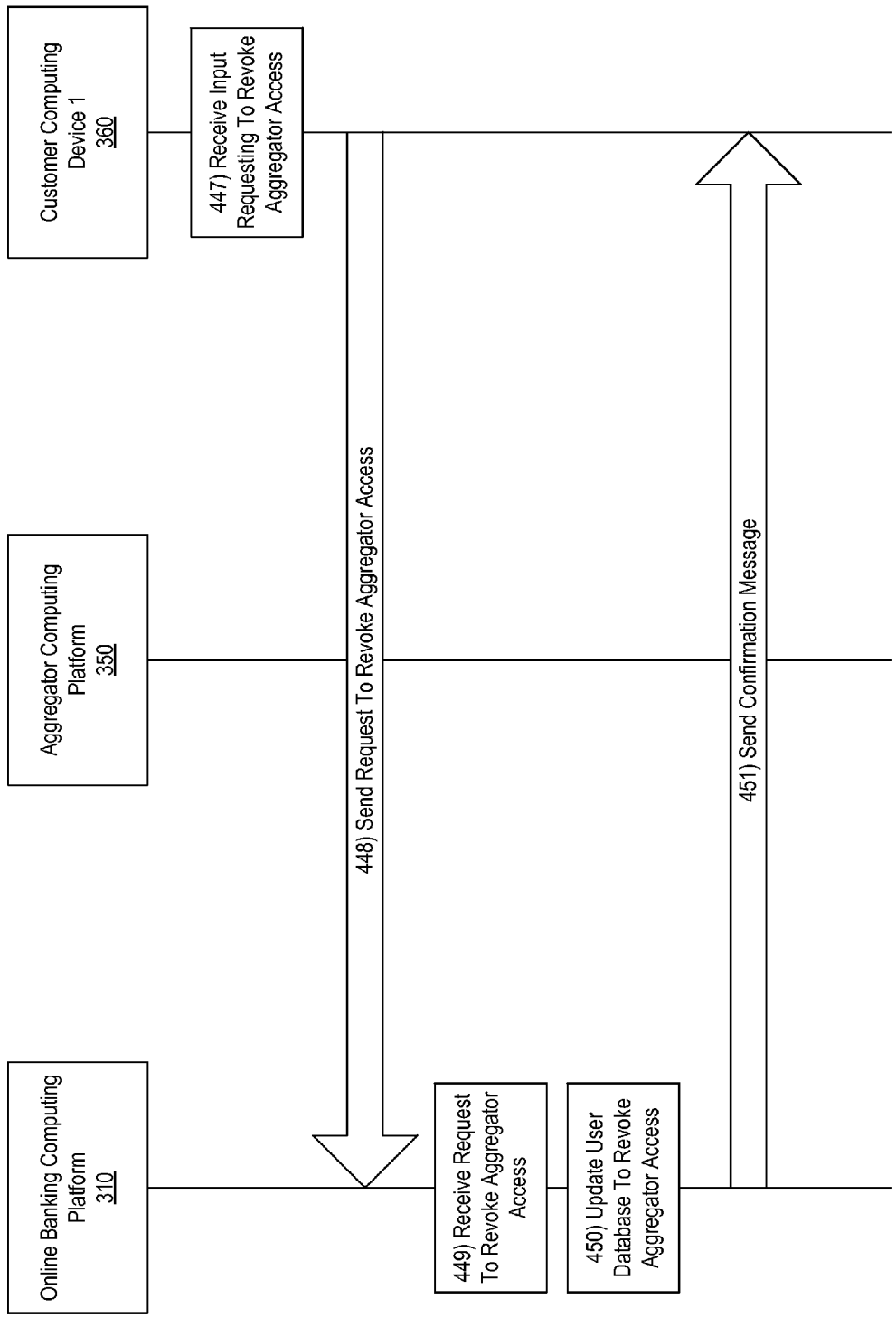
Figure 10:
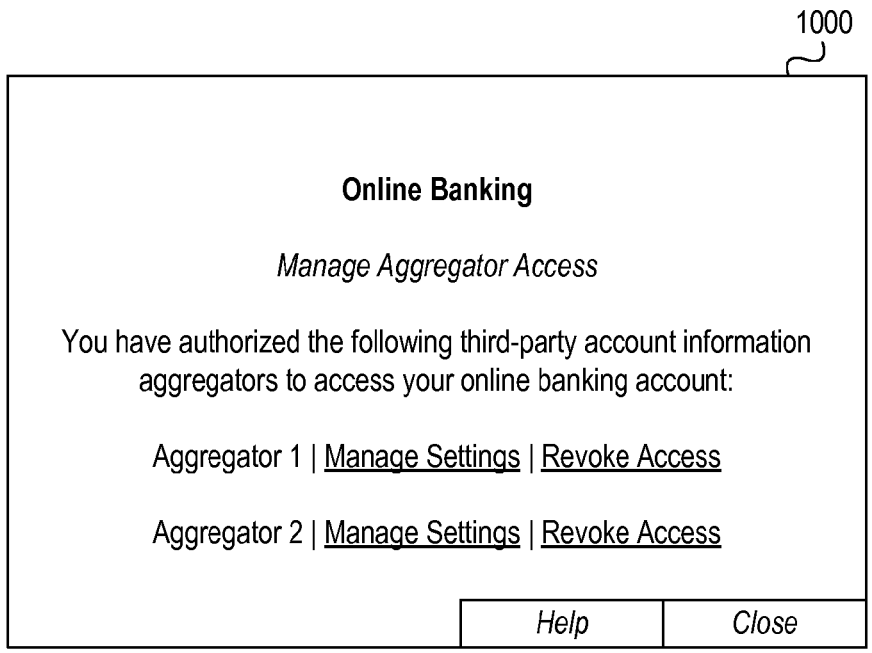
Figure 11:
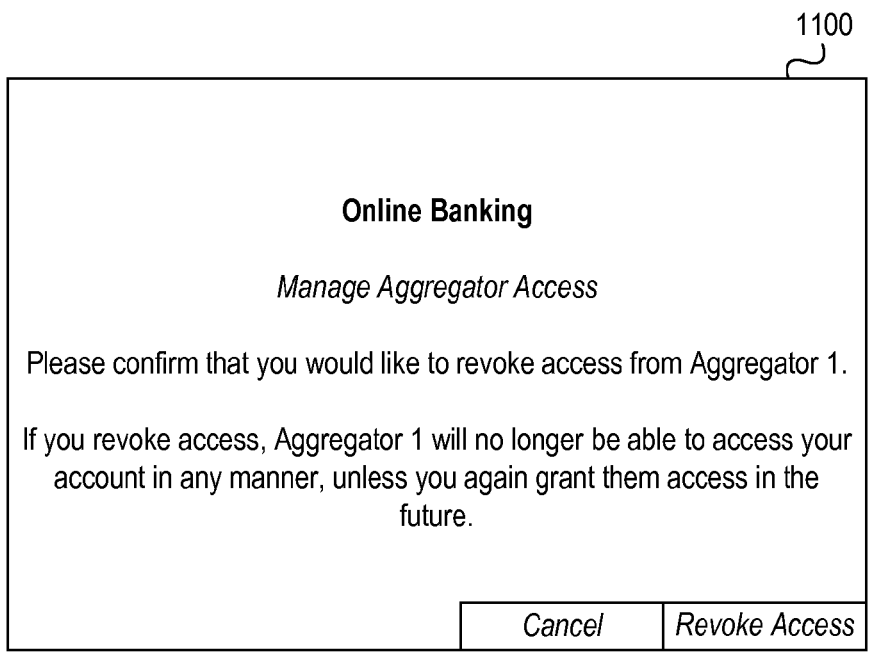

Referring to FIG. 4J, at step 447, customer computing device 360 may receive input requesting to revoke aggregator access. For example, at step 447, customer computing device 360 may receive input from the user of customer computing device 360 requesting to revoke access from a specific account information aggregator. Such input may, for instance, be received via an online banking user interface presented by customer computing device 360, via a mobile banking user interface presented by customer computing device 360, and/or via one or more other user interfaces presented by customer computing device 360. For example, in receiving input requesting to revoke aggregator access (e.g., at step 447), customer computing device 360 may display and/or otherwise present a graphical user interface similar to graphical user interface 1000, which is illustrated in FIG. 10. As seen in FIG. 10, graphical user interface 1000 may include text and/or other information identifying one or more account information aggregators to which the user of customer computing device 360 has granted access, as well as one or more links for managing settings with respect to and/or revoking access from the one or more account information aggregators. Additionally or alternatively, in receiving input requesting to revoke aggregator access (e.g., at step 447), customer computing device 360 may display and/or otherwise present a graphical user interface similar to graphical user interface 1100, which is illustrated in FIG. 11. As seen in FIG. 11, graphical user interface 1100 may include text and/or other information requesting the user to confirm whether to revoke access from a specific account information aggregator, as well as one or more controls for making a selection indicating whether to revoke access from the account information aggregator.

At step 448, customer computing device 360 may send a request to revoke aggregator access to online banking computing platform 310. For example, after receiving input requesting to revoke aggregator access (e.g., via one or more of the example user interfaces discussed above), customer computing device 360 may, at step 448, send a request to online banking computing platform 310 requesting to revoke access from a specific account information aggregator. At step 449, online banking computing platform 310 may receive the request to revoke aggregator access from customer computing device 360. At step 450, online banking computing platform 310 may update a user database to revoke access from the specific account information aggregator identified in the request. For example, online banking computing platform 310 may update information stored in user database 315 to reflect that access has been revoked from the account information aggregator. Additionally or alternatively, online banking computing platform 310 may destroy, delete, and/or otherwise invalidate one or more tokens that may have been used in providing and/or enabling access to the account information aggregator. For instance, online banking computing platform 310 may destroy, delete, and/or otherwise invalidate a refresh token associated with account information aggregator and the online banking account of the user of customer computing device 360, one or more access tokens, and/or the like. At step 451, online banking computing platform 310 may send a confirmation message to customer computing device 360, and such a confirmation message may, for instance, include information indicating that access has been revoked from the account information aggregator.

Figure 12:
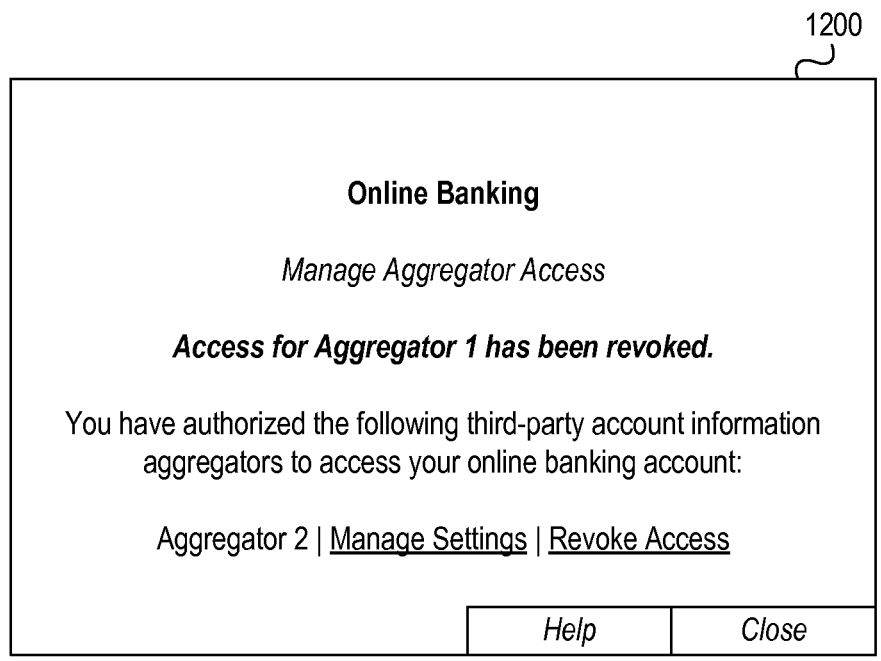

Referring to FIG. 4K, at step 452, customer computing device 360 may receive the confirmation message from online banking computing platform 310. At step 453, customer computing device 360 may present a notification based on the confirmation message. For example, in presenting such a notification, customer computing device 360 may display and/or otherwise present a graphical user interface similar to graphical user interface 1200, which is illustrated in FIG. 12. As seen in FIG. 12, graphical user interface 1200 may include text and/or other information indicating that the account information aggregator's access to the online banking account of the user of customer computing device 360 has been revoked.

FIGS. 5A-5J depict another illustrative event sequence for providing access to account information using authentication tokens in accordance with one or more example embodiments. In particular, the example event sequence shown in FIGS. 5A-5J illustrate how a financial institution may provide a web service via which an account information aggregator can obtain financial account information for one or more customers of the financial institution. As seen in FIGS. 5A-5J, several steps of the example event sequence are similar to the steps of the example event sequence discussed above and may be performed in a similar manner as discussed above. For the sake of brevity, some details that have already been discussed above will not be repeated below, although online banking computing platform 310, aggregator computing platform 350, and/or customer computing device 360 may perform one or more steps of the example event sequence in a similar manner and/or in accordance with the details discussed above, for instance, unless described in a different manner below.

For example, referring to FIG. 5A, at step 501, customer computing device 360 may receive input requesting an aggregator portal. At step 502, customer computing device 360 may send a request for an aggregator portal to aggregator computing platform 350. At step 503, aggregator computing platform 350 may receive the request for the aggregator portal from customer computing device 360. At step 504, aggregator computing platform 350 may authenticate customer computing device 360 and/or the user of customer computing device 360. At step 505, aggregator computing platform 350 may generate an aggregator portal user interface.

Figure 5B:
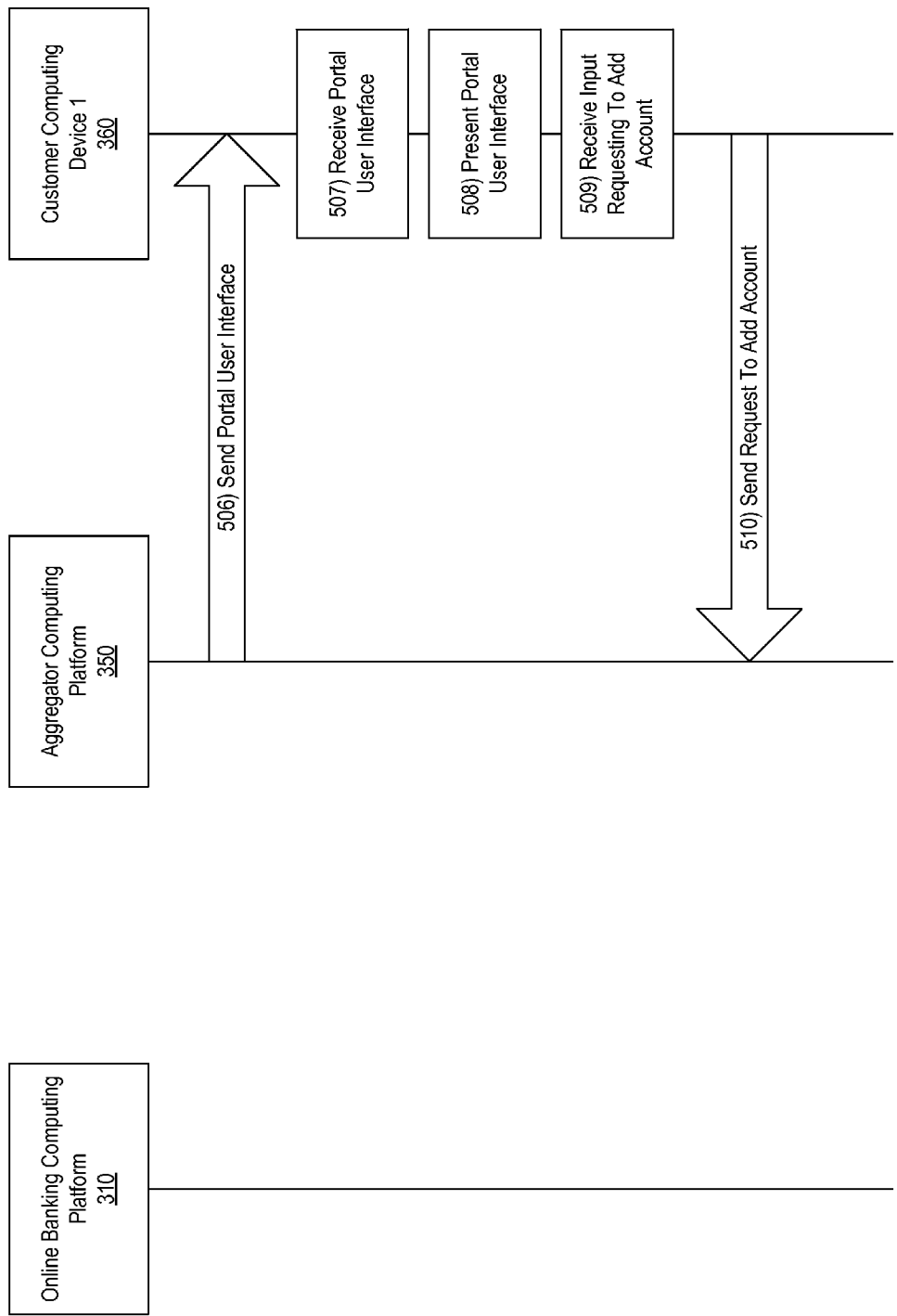

Referring to FIG. 5B, at step 506, aggregator computing platform 350 may send the aggregator portal user interface to customer computing device 360. At step 507, customer computing device 360 may receive the aggregator portal user interface from aggregator computing platform 350. At step 508, customer computing device 360 may present the aggregator portal user interface. At step 509, customer computing device 360 may receive input requesting to add a new account to the aggregator portal user interface provided by aggregator computing platform 350. At step 509, customer computing device 360 may send a request to add a new financial account to the aggregator portal user interface to aggregator computing platform 350.

Figure 5C:
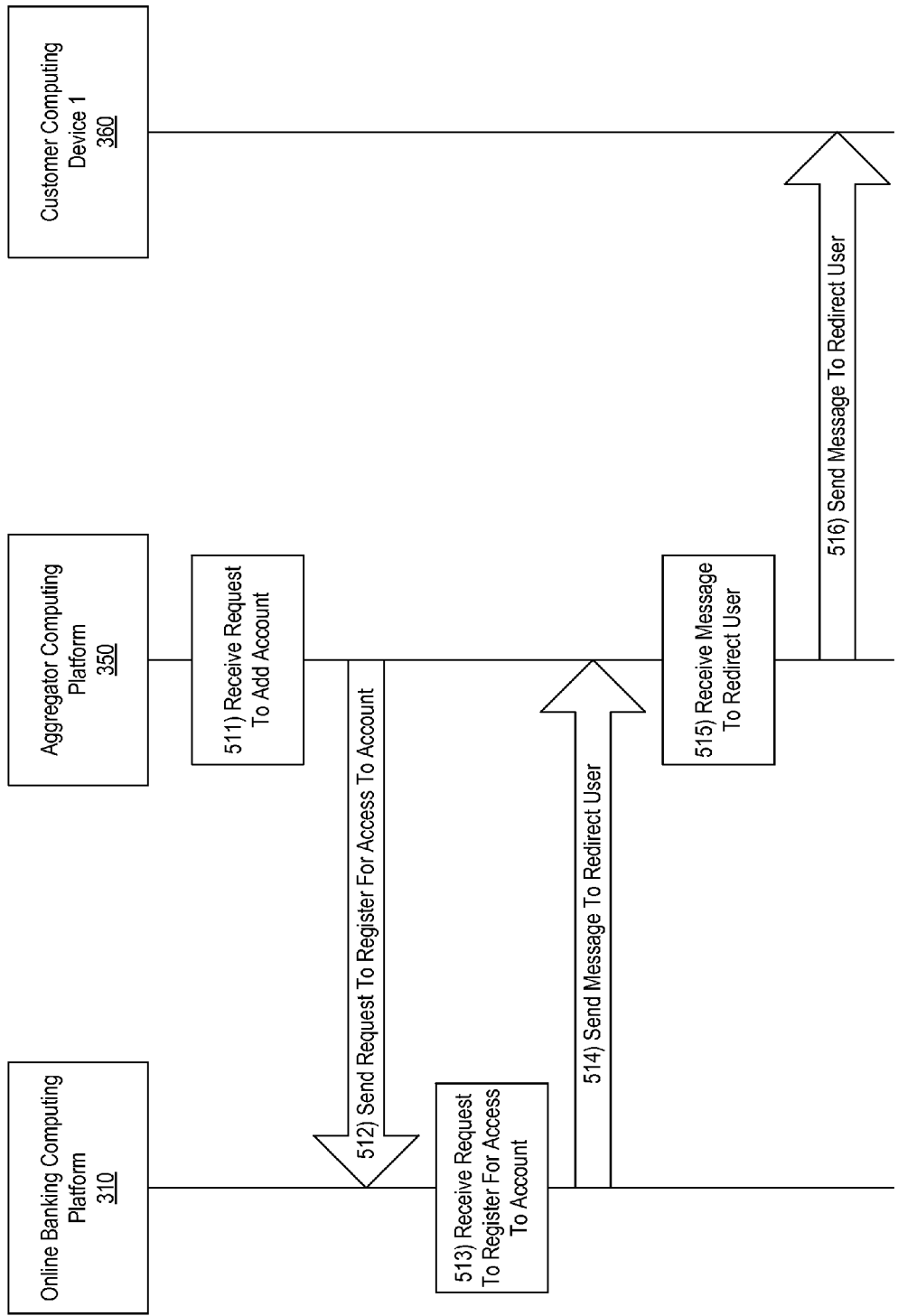
Figure 5E:
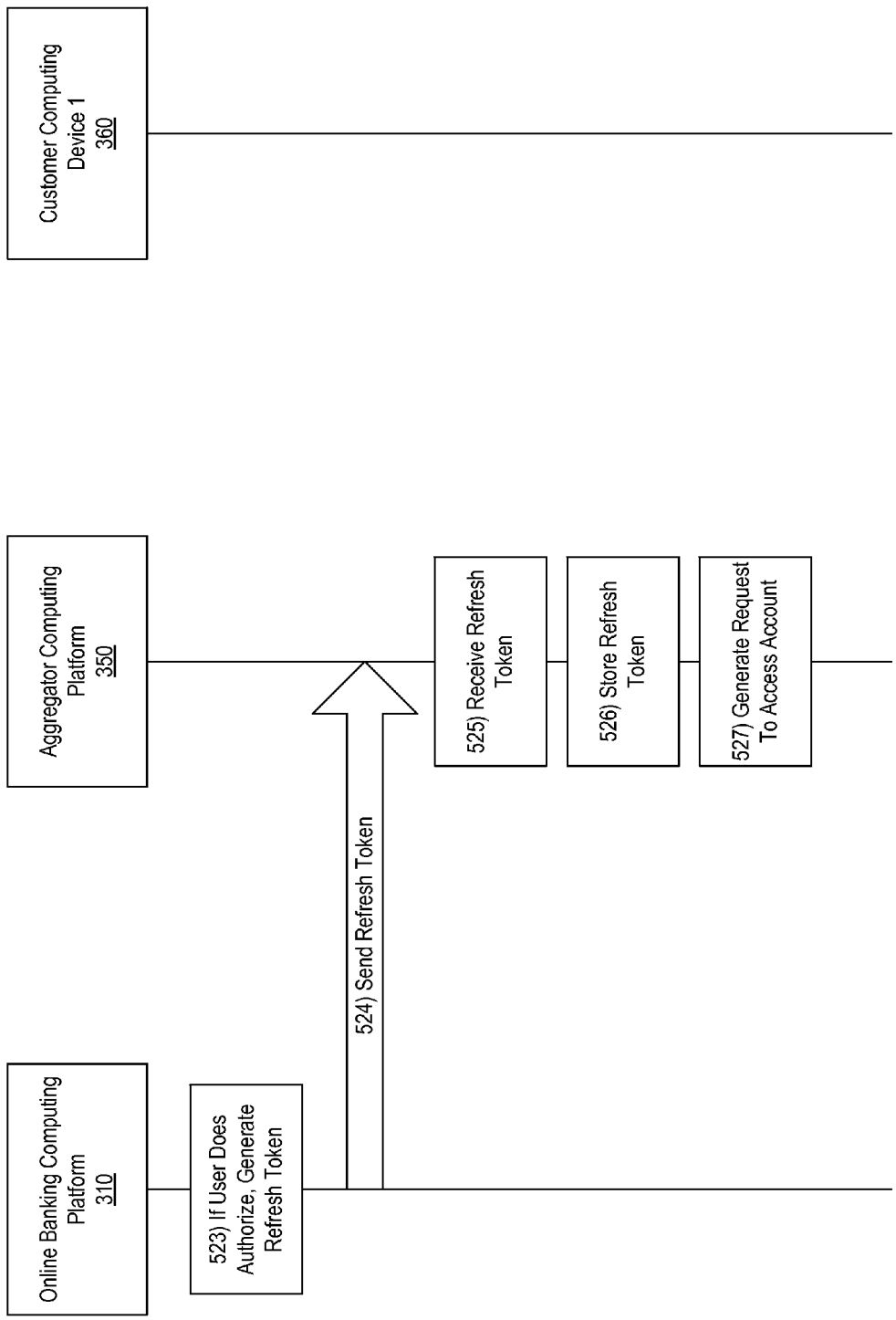

Referring to FIG. 5C, at step 511, aggregator computing platform 350 may receive the request to add a new financial account to the aggregator portal user interface from customer computing device 360. At step 512, aggregator computing platform 350 may send a request to register for access to the new financial account to online banking computing platform 310. At step 513, Online banking computing platform 310 may receive the request to register for access from aggregator computing platform 350. For example, at step 513, online banking computing platform 310 may receive, via the communication interface (e.g., communication interface 316), and from a computing platform associated with a third-party financial account information aggregator (e.g., aggregator computing platform 350), a request to register for access to an online banking account associated with a customer of a financial institution (who may, e.g., be the user of customer computing device 360). In some embodiments, the online banking account may be associated with one or more financial accounts which are maintained for the customer by the financial institution, and the system (e.g., online banking computing platform 310) may be operated by the financial institution. In some instances, the computing platform associated with the third-party financial account information aggregator (e.g., aggregator computing platform 350) may be configured to collect information associated with the one or more financial accounts which are maintained for the customer by the financial institution (which may, e.g., operate online banking computing platform 310) and may be further configured to collect information associated with one or more other financial accounts which are maintained for the customer by one or more other financial institutions different from the financial institution operating the system (e.g., online banking computing platform 310).

At step 514, online banking computing platform 310 may send to aggregator computing platform 350 a message to redirect customer computing device 360 to an authentication prompt. For example, based on receiving the request to register for access to the online banking account associated with the customer of the financial institution, online banking computing platform 310 may prompt the customer of the financial institution to authorize the third-party financial account information aggregator to access information associated with the online banking account associated with the customer of the financial institution.

At step 515, aggregator computing platform 350 may receive from online banking computing platform 310 the message to redirect customer computing device 360 to the authentication prompt. At step 516, aggregator computing platform 350 may send a message to customer computing device 360 redirecting customer computing device 360 and/or the user of customer computing device 360 to an authentication prompt provided by online banking computing platform 310 and/or provided by the financial institution operating online banking computing platform 310.

Referring to FIG. 5D, at step 517, customer computing device 360 may receive from aggregator computing platform 350 the message redirecting customer computing device 360 to the authentication prompt. At step 518, customer computing device 360 may send a message to online banking computing platform 310 requesting the authentication prompt. At step 519, online banking computing platform 310 may receive the message requesting the authentication prompt from customer computing device 360. At step 520, online banking computing platform 310 may authenticate the user of customer computing device 360. At step 521, online banking computing platform 310 may prompt the user of customer computing device 360 to authorize the account information aggregator to access the online banking account of the user of customer computing device 360. In some embodiments, prompting the customer of the financial institution to authorize the third-party financial account information aggregator to access the information associated with the online banking account associated with the customer of the financial institution may include: sending, via the communication interface (e.g., communication interface 316), and to a computing device associated with the customer of the financial institution (e.g., aggregator computing platform 350), an authorization prompt message comprising a prompt for the customer of the financial institution to allow the third-party financial account information aggregator to access the information associated with the online banking account; and receiving, via the communication interface (e.g., communication interface 316), and from the computing device associated with the customer of the financial institution (e.g., aggregator computing platform 350), an authorization response message comprising a response to the prompt included in the authorization prompt message.

At step 522, if the user of customer computing device 360 does not authorize the account information aggregator to access the online banking account, online banking computing platform 310 may send an error message to aggregator computing platform 350. For example, if the customer of the financial institution does not authorize the third-party financial account information aggregator to access the information associated with the online banking account associated with the customer of the financial institution, online banking computing platform 310 may send, via the communication interface (e.g., communication interface 316), and to the computing platform associated with the third-party financial account information aggregator (e.g., aggregator computing platform 350), an error message. Alternatively, referring to FIG. 5E, at step 523, if the user of customer computing device 360 does authorize the account information aggregator to access the online banking account, online banking computing platform 310 may generate a refresh token. At step 524, online banking computing platform 310 may send the refresh token to aggregator computing platform 350. For example, if the customer of the financial institution authorizes the third-party financial account information aggregator to access the information associated with the online banking account associated with the customer of the financial institution, online banking computing platform 310 may send, via the communication interface (e.g., communication interface 316), and to the computing platform associated with the third-party financial account information aggregator (e.g., aggregator computing platform 350), a refresh token.

At step 525, aggregator computing platform 350 may receive the refresh token from online banking computing platform 310. At step 526, aggregator computing platform 350 may store the refresh token received from online banking computing platform 310. At step 527, aggregator computing platform 350 may generate a request to access the online banking account to obtain financial account information associated with the online banking account. Referring to FIG. 5F, at step 528, aggregator computing platform 350 may send the request for access to the online banking account to online banking computing platform 310. At step 529, online banking computing platform 310 may receive from aggregator computing platform 350 the request for access to the online banking account. For example, after sending the refresh token to the computing platform associated with the third-party financial account information aggregator (e.g., aggregator computing platform 350), online banking computing platform 310 may receive, via the communication interface (e.g., communication interface 316), and from the computing platform associated with the third-party financial account information aggregator (e.g., aggregator computing platform 350), a request to access the online banking account associated with the customer of the financial institution. In some embodiments, the request to access the online banking account associated with the customer of the financial institution may include a copy of the refresh token.

At step 530, online banking computing platform 310 may validate the request to access the online banking account received from aggregator computing platform 350. For example, at step 530, online banking computing platform 310 may validate the request to access the online banking account associated with the customer of the financial institution based on the refresh token. In some embodiments, validating the request to access the online banking account associated with the customer of the financial institution based on the refresh token may include validating the copy of the refresh token included in the request to access the online banking account associated with the customer of the financial institution. In some instances, validating the copy of the refresh token included in the request to access the online banking account associated with the customer of the financial institution may include determining that the request to access the online banking account associated with the customer of the financial institution is not valid based on revocation information indicating that the customer has revoked the third-party financial account information aggregator's authorization to access the information associated with the online banking account associated with the customer of the financial institution. In some instances, the customer may have revoked the third-party financial account information aggregator's authorization to access the information associated with the online banking account associated with the customer of the financial institution via an online banking user interface. For example, the user of customer computing device 360 may have revoked access from the account information aggregator operating aggregator computing platform 350 via an online banking user interface provided by online banking computing platform 310 to customer computing device 360.

At step 531, if the request to access the online banking account is not valid, online banking computing platform 310 may send an error message to aggregator computing platform 350. For example, if the request to access the online banking account associated with the customer of the financial institution is not valid, online banking computing platform 310 may send, via the communication interface (e.g., communication interface 316), and to the computing platform associated with the third-party financial account information aggregator (e.g., aggregator computing platform 350), an error message.

Alternatively, at step 532, if the request to access the online banking account is valid, online banking computing platform 310 may send an access token to aggregator computing platform 350. For example, at step 532, online banking computing platform 310 may send, via the communication interface (e.g., communication interface 316), and to the computing platform associated with the third-party financial account information aggregator (e.g., aggregator computing platform 350), an access token, based on validating the copy of the refresh token included in the request to access the online banking account associated with the customer of the financial institution. In some embodiments, the access token may be configured to enable the computing platform associated with the third-party financial account information aggregator to authenticate with and obtain information from the at least one web service. For example, the access token (which may, e.g., be provided by online banking computing platform 310 to aggregator computing platform 350) may be configured to enable aggregator computing platform 350 to authenticate with and obtain information from one or more web services, such as a web service provided by web services module 314 of online banking computing platform 310 and/or a web service provided by web services module 324 of account management computing platform 320. For example, the access token provided to aggregator computing platform 350 by online banking computing platform 310 may be used to and/or usable by aggregator computing platform 350 to connect to, authenticate with, and obtain financial account information for a specific customer's online banking account from a web service provided by web services module 314 of online banking computing platform 310 and/or from a web service provided by web services module 324 of account management computing platform 320. As illustrated below, in this example event sequence, aggregator computing platform 350 may obtain financial account information via one or more web services, such as a web service provided by web services module 314 of online banking computing platform 310 and/or a web service provided by web services module 324 of account management computing platform 320, instead of obtaining financial account information by performing a screen scrape of an online banking user interface, as in the example event sequence discussed above.

Figure 5G:
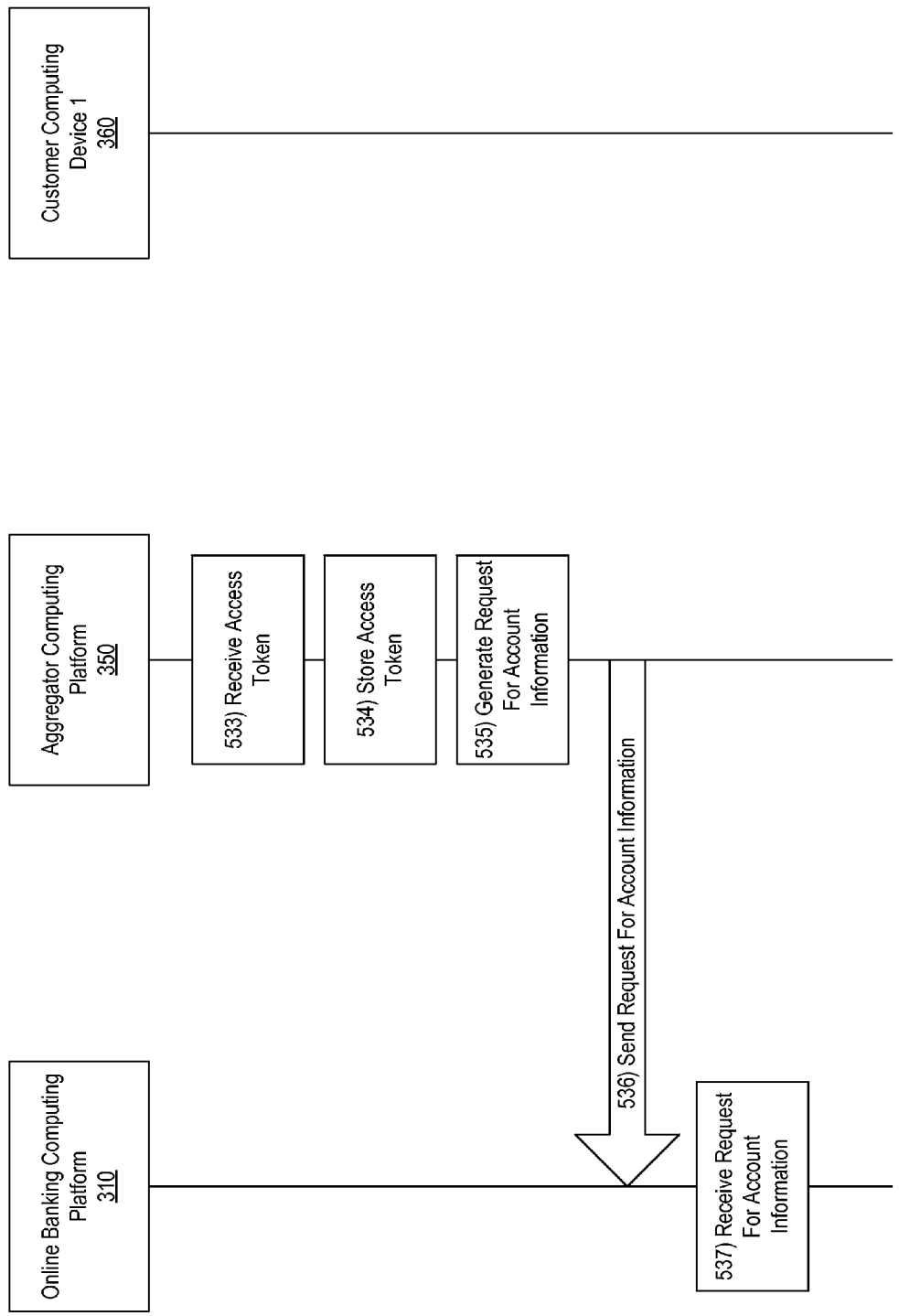

Referring to FIG. 5G, at step 533, aggregator computing platform 350 may receive the access token from online banking computing platform 310. At step 534, aggregator computing platform 350 may store the access token received from online banking computing platform 310. At step 535, aggregator computing platform 350 may generate a request for account information. For example, at step 535, aggregator computing platform 350 may generate an access request message that includes a copy of the access token, which may enable aggregator computing platform 350 to access one or more web services, as discussed above. At step 536, aggregator computing platform 350 may send the request for account information to online banking computing platform 310. In some instances, rather than sending the request for account information to online banking computing platform 310, aggregator computing platform 350 may send the request for account information (which may, e.g., include a copy of the access token) to account management computing platform 320, and such a request may be handled and/or responded to by web services module 324 of account management computing platform 320. At step 537, online banking computing platform 310 may receive the request for account information from aggregator computing platform 350.

Figure 5H:
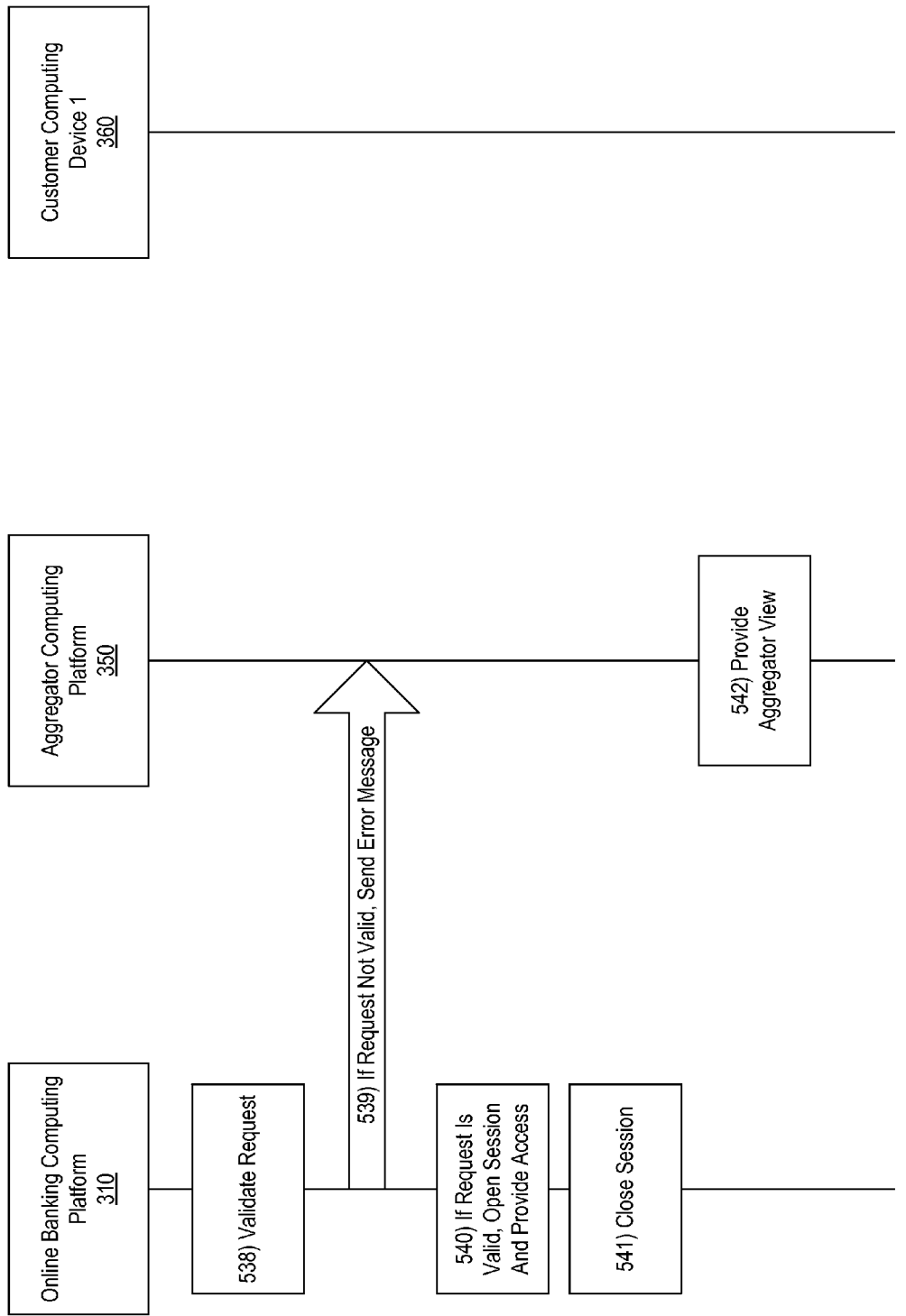
Figure 5I:
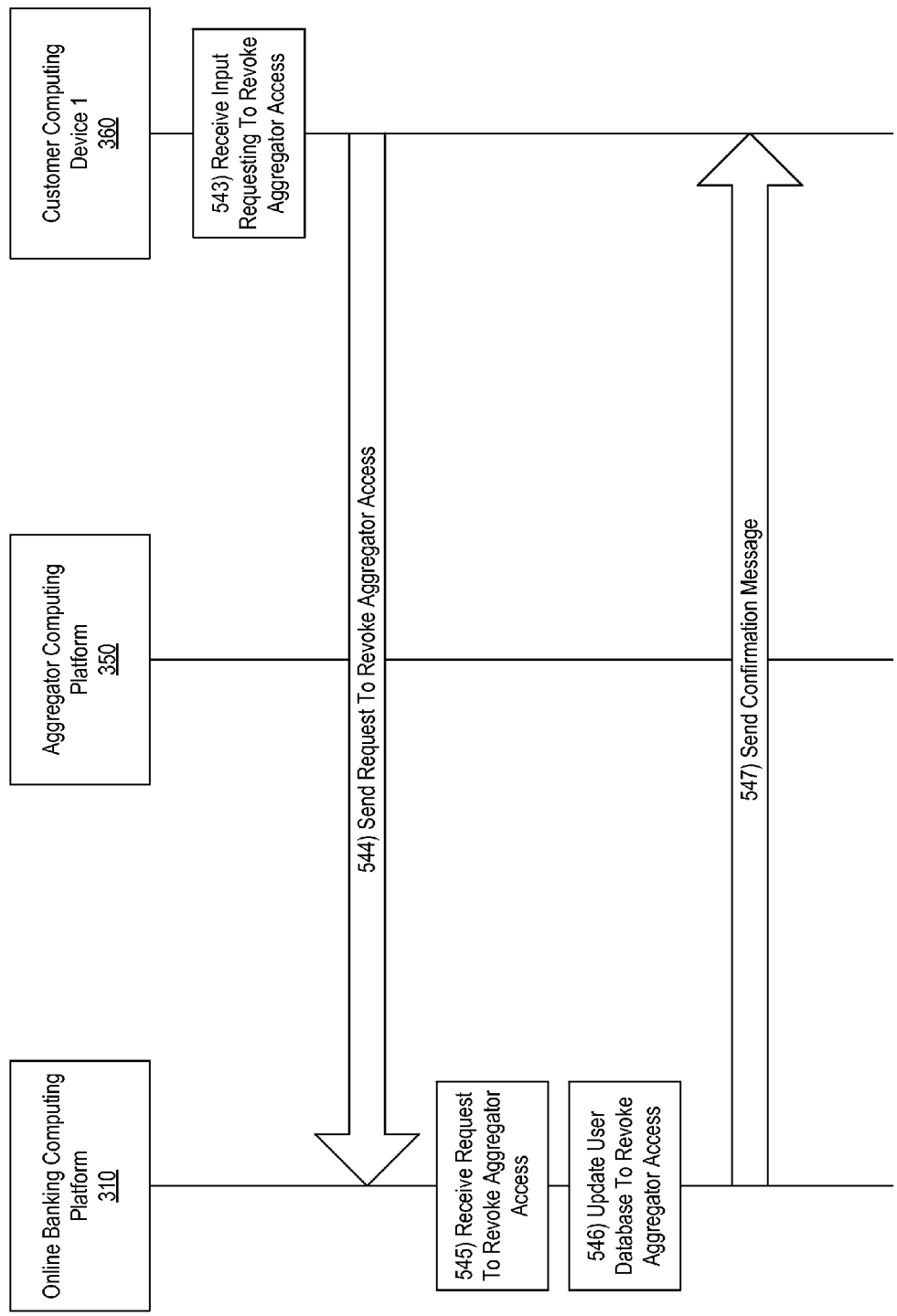

Referring to FIG. 5H, at step 538, online banking computing platform 310 may validate the request for account information. For example, at step 538, online banking computing platform 310 may validate the request for account information based on the access token. If the request for account information is not valid, online banking computing platform 310 may, at step 539, send an error message to aggregator computing platform 350.

Alternatively, if the request for account information is valid, online banking computing platform 310 may, at step 540, open a session and provide aggregator computing platform 350 with access to financial account information associated with the online banking account (e.g., the online banking account of the user of customer computing device 360). For example, if the request to access the online banking account associated with the customer of the financial institution is valid, online banking computing platform 310 may provide, to the computing platform associated with the third-party financial account information aggregator (e.g., aggregator computing platform 350), financial account information associated with the online banking account associated with the customer of the financial institution via at least one web service. For example, in providing access to financial account information to aggregator computing platform 350 at step 540, online banking computing platform 310 may provide access to aggregator computing platform 350 via one or more web services and/or one or more custom application programming interfaces. In providing access via one or more web services and/or one or more custom application programming interfaces, online banking computing platform 310 may, for instance, receive, process, and/or respond to one or more requests and/or other data messages from aggregator computing platform 350 (which may, e.g., request account balance information, transaction history information, and/or other financial account information associated with the online banking account of the user of customer computing device 360). In some instances, the web service may be provided by web services module 314 of online banking computing platform 310, while in other instances, the web service may be provided by web services module 324 of account management computing platform 320. In this way, the account information aggregator operating aggregator computing platform 350 may obtain financial account information from one or more web services provided by online banking computing platform 310 and/or by one or more other computing platforms, such as account management computing platform 320, which may also be operated by the financial institution operating online banking computing platform 310. In addition, by obtaining financial account information from the one or more web services in this way, the account information aggregator might not need to access an online banking user interface provided by online banking computing platform 310, as the account information aggregator might not need to perform a screen scrape of such an online banking user interface to extract or obtain financial account information. Rather, the account information aggregator operating aggregator computing platform 350 may simply obtain such information via the one or more web services (which may, e.g., provide enhanced information security for both the financial institution operating online banking computing platform 310 and its customers, such as the user of customer computing device 360, as access to the online banking user interface may be restricted and limited, read-only access to financial account information may be provided to the account information aggregator).

In some embodiments, the at least one web service may implement a custom application programming interface that enables the computing platform associated with the third-party financial account information aggregator to access the financial account information associated with the online banking account associated with the customer of the financial institution. For example, the at least one web service (which may, e.g., be provided by web services module 314 of online banking computing platform 310 and/or by web services module 324 of account management computing platform 320) may implement a custom application programming interface that enables aggregator computing platform 350 to access financial account information associated with the online banking account of the user of customer computing device 360. The custom application programming interface may, for instance, define and/or otherwise provide one or more commands that may be executed by aggregator computing platform 350 via the at least one web service so as to authenticate with the web service, exchange a refresh token and/or an access token, request financial account information for one or more accounts maintained by the financial institution, and/or otherwise perform one or more other commands (which may, e.g., be defined by the financial institution for use with one or more third-party account information aggregators).

At step 541, online banking computing platform 310 may close the session. For example, at step 541, online banking computing platform 310 may close the session when the access token expires and/or when aggregator computing platform 350 disconnects from online banking computing platform 310 and/or one or more web services used to obtain the financial account information. At step 542, aggregator computing platform 350 may provide an aggregator view. For example, at step 542, aggregator computing platform 350 may provide an aggregator portal user interface to customer computing device 360 and/or to the user of customer computing device 360. Such an aggregator portal user interface may, for instance, include financial account information obtained by aggregator computing platform 350 and/or by the account information aggregator operating aggregator computing platform 350 via the one or more web services (which may, e.g., be provided by web services module 314 of online banking computing platform 310 and/or by web services module 324 of account management computing platform 320).

As in the example event sequence discussed above, a customer of the financial institution, such as the user of customer computing device 360, may be able to revoke permission from an account information aggregator after initially granting such permission and/or otherwise enabling an account information aggregator to access their online banking account. For example, referring to FIG. 5I, at step 543, customer computing device 360 may receive input requesting to revoke aggregator access. At step 544, customer computing device 360 may send a request to revoke aggregator access to online banking computing platform 310. At step 545, online banking computing platform 310 may receive the request to revoke aggregator access from customer computing device 360. At step 546, online banking computing platform 310 may update information stored in a user database to revoke access from the specific account information aggregator identified in the request. At step 547, online banking computing platform 310 may send a confirmation message to customer computing device 360 to confirm that access has been revoked for the specific account information aggregator identified in the request. Referring to FIG. 5J, at step 548, customer computing device 360 may receive the confirmation message. At step 549, customer computing device 360 may present the confirmation message.

Figure 13:
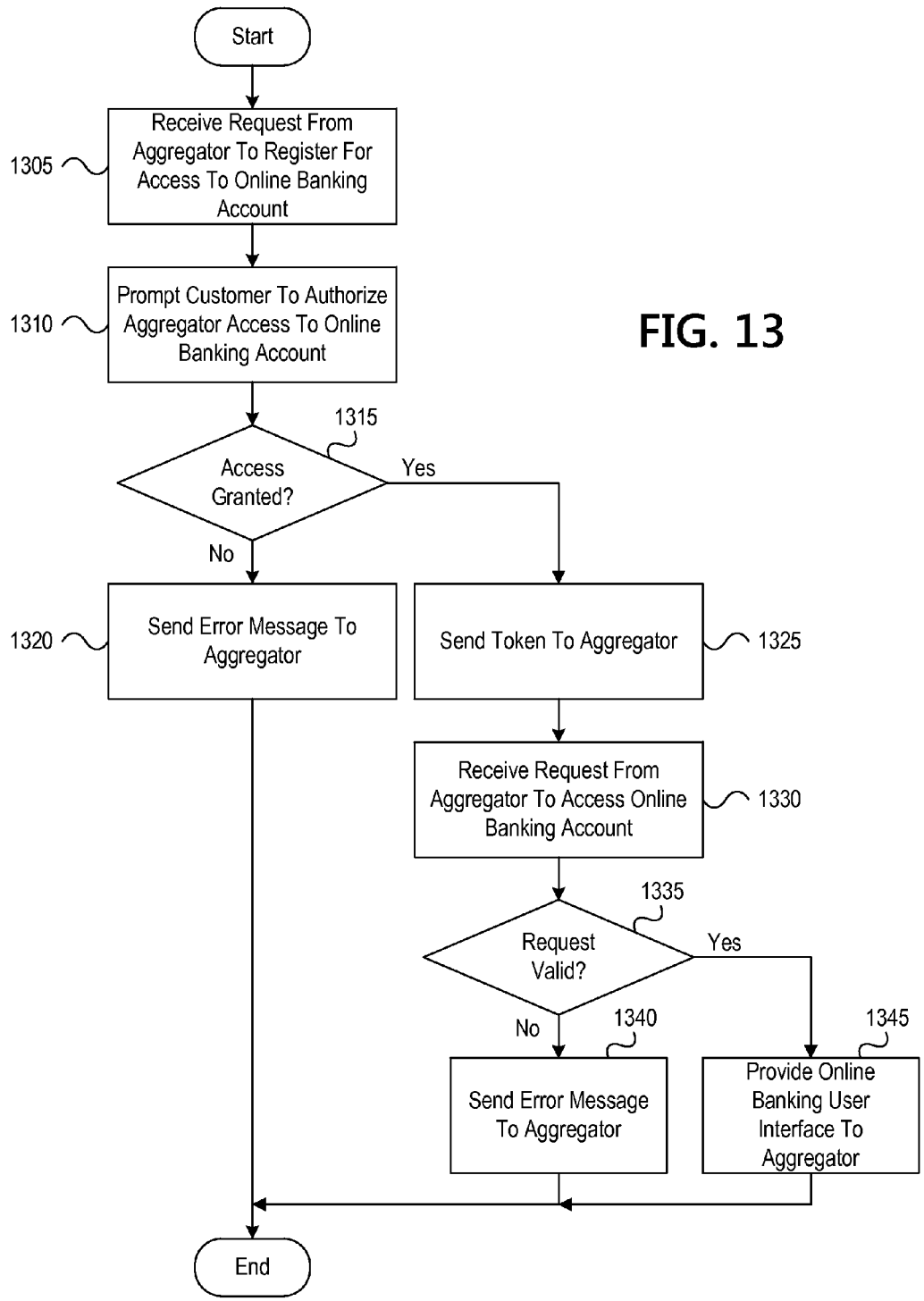
FIG. 13 depicts an illustrative method for providing access to account information using authentication tokens in accordance with one or more example embodiments.

FIG. 13 depicts an illustrative method for providing access to account information using authentication tokens in accordance with one or more example embodiments. Referring to FIG. 13, at step 1305, a computing platform may receive a request from an aggregator to register for access to an online banking account. At step 1310, the computing platform may prompt a customer to authorize aggregator access to the online banking account. At step 1315, the computing platform may determine whether access to the online banking account has been granted by the customer. If the computing platform determines that access to the online banking account has not been granted, then at step 1320, the computing platform may send an error message to the aggregator. Alternatively, if the computing platform determines that access to the online banking account has been granted, then at step 1325, the computing platform may send a token to the aggregator. At step 1330, the computing platform may receive a request from the aggregator to access the online banking account. At step 1335, the computing platform may determine whether the request is valid. If the computing platform determines that the request is not valid, then at step 1340, the computing platform may send an error message to the aggregator. Alternatively, if the computing platform determines that the request is valid, then at step 1345, the computing platform may provide an online banking user interface to the aggregator.

Figure 14:
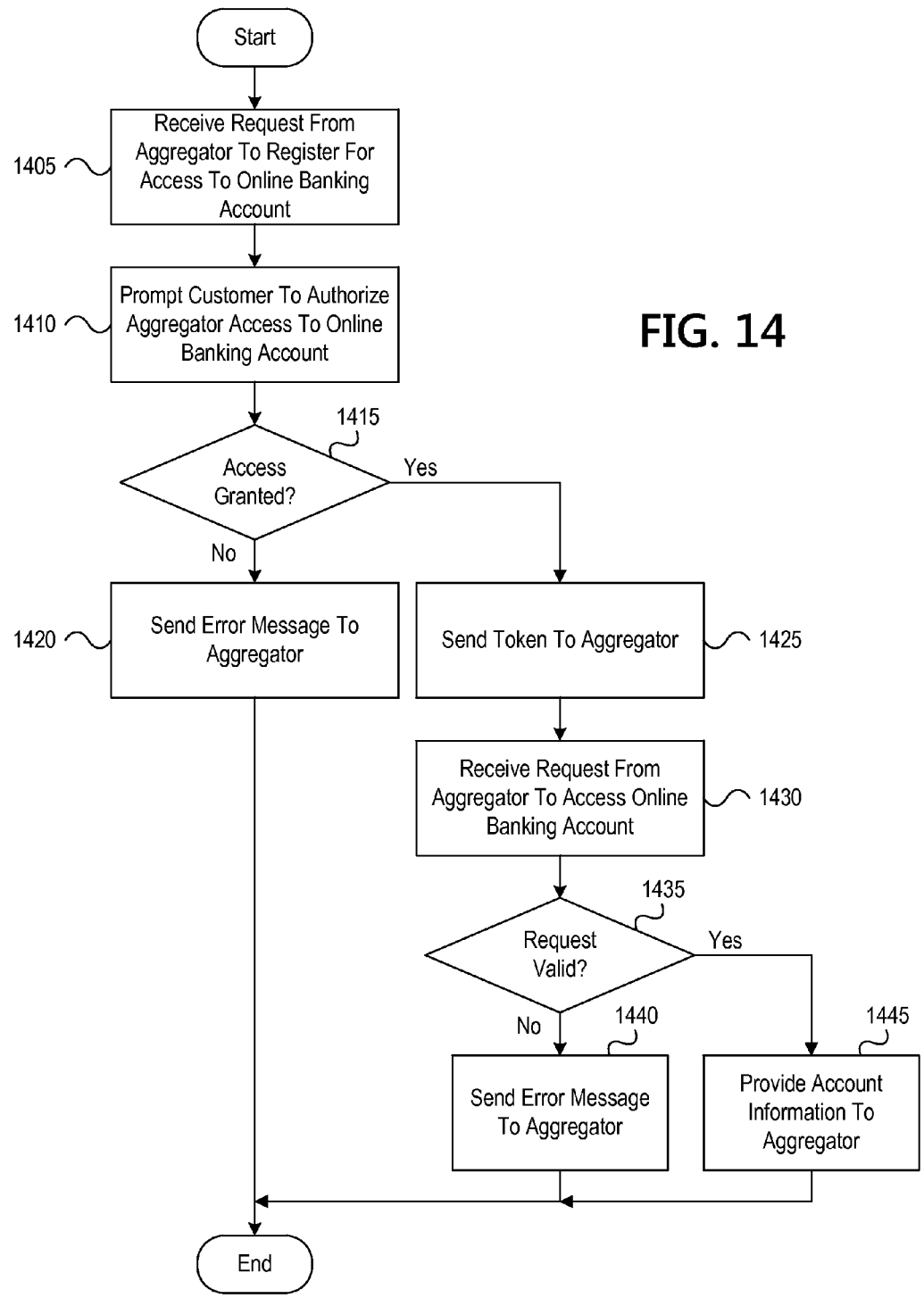
FIG. 14 depicts another illustrative method for providing access to account information using authentication tokens in accordance with one or more example embodiments.

FIG. 14 depicts another illustrative method for providing access to account information using authentication tokens in accordance with one or more example embodiments. Referring to FIG. 14, at step 1405, a computing platform may receive a request from an aggregator to register for access to an online banking account. At step 1410, the computing platform may prompt a customer to authorize aggregator access to the online banking account.

At step 1415, the computing platform may determine whether access to the online banking account has been granted by the customer. If the computing platform determines that access to the online banking account has not been granted, then at step 1420, the computing platform may send an error message to the aggregator. Alternatively, if the computing platform determines that access to the online banking account has been granted, then at step 1425, the computing platform may send a token to the aggregator. At step 1430, the computing platform may receive a request from the aggregator to access the online banking account. At step 1435, the computing platform may determine whether the request is valid. If the computing platform determines that the request is not valid, then at step 1440, the computing platform may send an error message to the aggregator. Alternatively, if the computing platform determines that the request is valid, then at step 1445, the computing platform may provide account information to the aggregator (e.g., via one or more web services).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
   receive, via the communication interface, and from a computing platform associated with a third-party financial account information aggregator, a request to register for access to an online banking account associated with a customer of a financial institution;
   based on receiving the request to register for access to the online banking account associated with the customer of the financial institution, prompt the customer of the financial institution to authorize the third-party financial account information aggregator to access information associated with the online banking account associated with the customer of the financial institution;
   if the customer of the financial institution authorizes the third-party financial account information aggregator to access the information associated with the online banking account associated with the customer of the financial institution, send, via the communication interface, and to the computing platform associated with the third-party financial account information aggregator, a refresh token;
   after sending the refresh token to the computing platform associated with the third-party financial account information aggregator, receive, via the communication interface, and from the computing platform associated with the third-party financial account information aggregator, a request to access the online banking account associated with the customer of the financial institution;
   validate the request to access the online banking account associated with the customer of the financial institution based on the refresh token; and
   if the request to access the online banking account associated with the customer of the financial institution is valid, provide, to the computing platform associated with the third-party financial account information aggregator, financial account information associated with the online banking account associated with the customer of the financial institution via at least one web service.

2. The system of claim 1, wherein the at least one web service implements a custom application programming interface that enables the computing platform associated with the third-party financial account information aggregator to access the financial account information associated with the online banking account associated with the customer of the financial institution.

3. The system of claim 1,
   wherein the online banking account is associated with one or more financial accounts which are maintained for the customer by the financial institution, and
   wherein the system is operated by the financial institution.

4. The system of claim 3, wherein the computing platform associated with the third-party financial account information aggregator is configured to collect information associated with the one or more financial accounts which are maintained for the customer by the financial institution and is further configured to collect information associated with one or more other financial accounts which are maintained for the customer by one or more other financial institutions different from the financial institution operating the system.

5. The system of claim 1, wherein prompting the customer of the financial institution to authorize the third-party financial account information aggregator to access the information associated with the online banking account associated with the customer of the financial institution comprises:
   sending, via the communication interface, and to a computing device associated with the customer of the financial institution, an authorization prompt message comprising a prompt for the customer of the financial institution to allow the third-party financial account information aggregator to access the information associated with the online banking account; and
   receiving, via the communication interface, and from the computing device associated with the customer of the financial institution, an authorization response message comprising a response to the prompt included in the authorization prompt message.

6. The system of claim 1, wherein the memory stores additional computer-readable instructions that, when executed by the at least one processor, further cause the system to:
   if the customer of the financial institution does not authorize the third-party financial account information aggregator to access the information associated with the online banking account associated with the customer of the financial institution, send, via the communication interface, and to the computing platform associated with the third-party financial account information aggregator, an error message.

7. The system of claim 1, wherein the request to access the online banking account associated with the customer of the financial institution comprises a copy of the refresh token.

8. The system of claim 7, wherein validating the request to access the online banking account associated with the customer of the financial institution based on the refresh token comprises validating the copy of the refresh token included in the request to access the online banking account associated with the customer of the financial institution.

9. The system of claim 8,
prior to providing the financial account information associated with the online banking account associated with the customer of the financial institution via at least one web service:
send, via the communication interface, and to the computing platform associated with the third-party financial account information aggregator, an access token, based on validating the copy of the refresh token included in the request to access the online banking account associated with the customer of the financial institution,
wherein the access token is configured to enable the computing platform associated with the third-party financial account information aggregator to authenticate with and obtain information from the at least one web service.

10. The system of claim 8, wherein validating the copy of the refresh token included in the request to access the online banking account associated with the customer of the financial institution comprises determining that the request to access the online banking account associated with the customer of the financial institution is not valid based on revocation information indicating that the customer has revoked the third-party financial account information aggregator's authorization to access the information associated with the online banking account associated with the customer of the financial institution.

11. The system of claim 10, wherein the customer revoked the third-party financial account information aggregator's authorization to access the information associated with the online banking account associated with the customer of the financial institution via an online banking user interface.

12. The system of claim 1, wherein the memory stores additional computer-readable instructions that, when executed by the at least one processor, further cause the system to:
if the request to access the online banking account associated with the customer of the financial institution is not valid, send, via the communication interface, and to the computing platform associated with the third-party financial account information aggregator, an error message.

13. A method, comprising:
at a first computing platform comprising at least one processor, memory, and a communication interface:
receiving, by the at least one processor, via the communication interface, and from a second computing platform associated with a third-party financial account information aggregator, a request to register for access to an online banking account associated with a customer of a financial institution;
based on receiving the request to register for access to the online banking account associated with the customer of the financial institution, prompting, by the at least one processor, the customer of the financial institution to authorize the third-party financial account information aggregator to access information associated with the online banking account associated with the customer of the financial institution;
if the customer of the financial institution authorizes the third-party financial account information aggregator to access the information associated with the online banking account associated with the customer of the financial institution, sending, by the at least one processor, via the communication interface, and to the second computing platform associated with the third-party financial account information aggregator, a refresh token;
after sending the refresh token to the second computing platform associated with the third-party financial account information aggregator, receiving, by the at least one processor, via the communication interface, and from the second computing platform associated with the third-party financial account information aggregator, a request to access the online banking account associated with the customer of the financial institution;
validating, by the at least one processor, the request to access the online banking account associated with the customer of the financial institution based on the refresh token; and
if the request to access the online banking account associated with the customer of the financial institution is valid, providing, by the at least one processor, to the second computing platform associated with the third-party financial account information aggregator, financial account information associated with the online banking account associated with the customer of the financial institution via at least one web service.

14. The method of claim 13, wherein the at least one web service implements a custom application programming interface that enables the second computing platform associated with the third-party financial account information aggregator to access the financial account information associated with the online banking account associated with the customer of the financial institution.

15. The method of claim 13,
wherein the online banking account is associated with one or more financial accounts which are maintained for the customer by the financial institution, and
wherein the first computing platform is operated by the financial institution.

16. The method of claim 15, wherein the second computing platform associated with the third-party financial account information aggregator is configured to collect information associated with the one or more financial accounts which are maintained for the customer by the financial institution and is further configured to collect information associated with one or more other financial accounts which are maintained for the customer by one or more other financial institutions different from the financial institution operating the first computing platform.

17. The method of claim 13, wherein prompting the customer of the financial institution to authorize the third-party financial account information aggregator to access the information associated with the online banking account associated with the customer of the financial institution comprises:
sending, via the communication interface, and to a computing device associated with the customer of the financial institution, an authorization prompt message comprising a prompt for the customer of the financial institution to allow the third-party financial account information aggregator to access the information associated with the online banking account; and receiving, via the communication interface, and from the computing device associated with the customer of the financial institution, an authorization response message comprising a response to the prompt included in the authorization prompt message.

18. The method of claim 13, further comprising:

if the customer of the financial institution does not authorize the third-party financial account information aggregator to access the information associated with the online banking account associated with the customer of the financial institution, sending, by the at least one processor, via the communication interface, and to the second computing platform associated with the third-party financial account information aggregator, an error message.

19. The method of claim 13, wherein the request to access the online banking account associated with the customer of the financial institution comprises a copy of the refresh token.

20. One or more non-transitory computer-readable media storing instructions that, when executed by a computer system comprising at least one processor, memory, and a communication interface, cause the computer system to:

receive, via the communication interface, and from a computing platform associated with a third-party financial account information aggregator, a request to register for access to an online banking account associated with a customer of a financial institution;

based on receiving the request to register for access to the online banking account associated with the customer of the financial institution, prompt the customer of the financial institution to authorize the third-party financial account information aggregator to access information associated with the online banking account associated with the customer of the financial institution;

if the customer of the financial institution authorizes the third-party financial account information aggregator to access the information associated with the online banking account associated with the customer of the financial institution, send, via the communication interface, and to the computing platform associated with the third-party financial account information aggregator, a refresh token;

after sending the refresh token to the computing platform associated with the third-party financial account information aggregator, receive, via the communication interface, and from the computing platform associated with the third-party financial account information aggregator, a request to access the online banking account associated with the customer of the financial institution;

validate the request to access the online banking account associated with the customer of the financial institution based on the refresh token; and if the request to access the online banking account associated with the customer of the financial institution is valid, provide, to the computing platform associated with the third-party financial account information aggregator, financial account information associated with the online banking account associated with the customer of the financial institution via at least one web service.

* * * * *